United States Patent
Shahar

(10) Patent No.: US 7,379,644 B2
(45) Date of Patent: May 27, 2008

(54) PHASE WAVELENGTH AND POLARIZATION INSENSITIVE OPTICAL DEVICES

(76) Inventor: Arie Shahar, 14 David Navon St., P.O. Box 8448, Moshav Magshimim (IL)

(*) Notice: Subject to any disclaimer, the term of this patent is extended or adjusted under 35 U.S.C. 154(b) by 0 days.

(21) Appl. No.: 11/550,122

(22) Filed: Oct. 17, 2006

(65) Prior Publication Data

US 2007/0103684 A1 May 10, 2007

Related U.S. Application Data

(60) Provisional application No. 60/734,124, filed on Nov. 7, 2005.

(51) Int. Cl.
*G02B 6/00* (2006.01)
(52) U.S. Cl. .................................. 385/122
(58) Field of Classification Search ............ 385/122
See application file for complete search history.

(56) References Cited

U.S. PATENT DOCUMENTS

| | | | |
|---|---|---|---|
| 7,123,401 B2* | 10/2006 | Shahar et al. ............. 359/326 |
| 7,136,557 B2 | 11/2006 | Shahar et al. |
| 7,142,750 B2* | 11/2006 | Shahar ..................... 385/37 |
| 7,146,072 B2* | 12/2006 | Shahar et al. ............. 385/27 |
| 7,203,396 B2* | 4/2007 | Shahar et al. ............. 385/27 |
| 7,215,844 B2* | 5/2007 | Shahar ..................... 385/24 |
| 2004/0202483 A1 | 10/2004 | Shahar et al. |
| 2004/0213506 A1* | 10/2004 | Shahar et al. ............. 385/15 |
| 2004/0233513 A1* | 11/2004 | Shahar et al. ............ 359/326 |

* cited by examiner

*Primary Examiner*—Quyen P Leung
(74) *Attorney, Agent, or Firm*—David Pressman

(57) ABSTRACT

An optical chopper includes an optical loop having first and second terminals and includes first and second nonlinear elements. The optical loop is arranged to receive, at the first and the second terminals, a pulse-modulated signal and a continuous beam, respectively. The optical loop is arranged to cause the pulse-modulated signal and the continuous beam to counter-propagate in the loop and to produce in the first nonlinear element an inverted pulse-modulated signal having modulation which is inverted with respect to the pulse modulation of the pulse-modulated signal and to cause the inverted pulse-modulated signal to chop the pulse-modulated signal in the second nonlinear element.

36 Claims, 11 Drawing Sheets

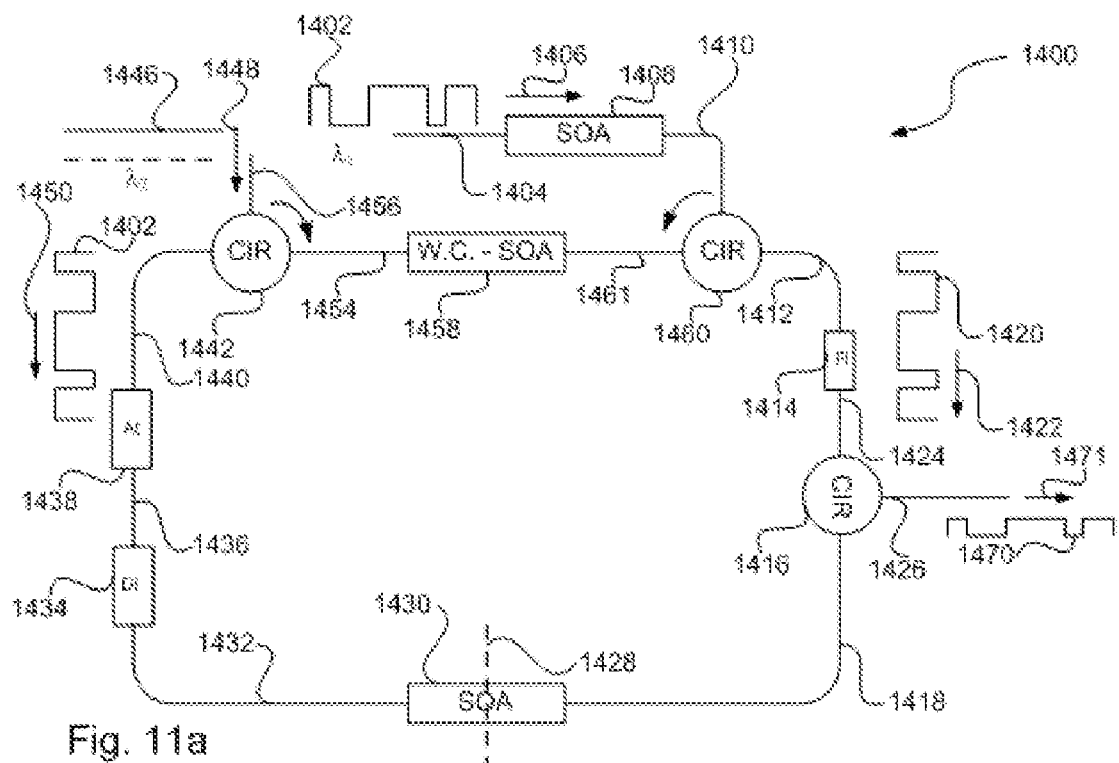
Fig. 11a
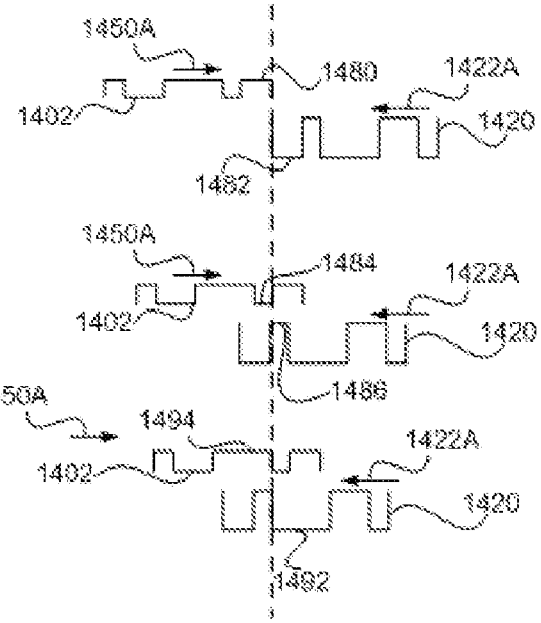
Fig. 11b
Fig. 11c
Fig. 11d

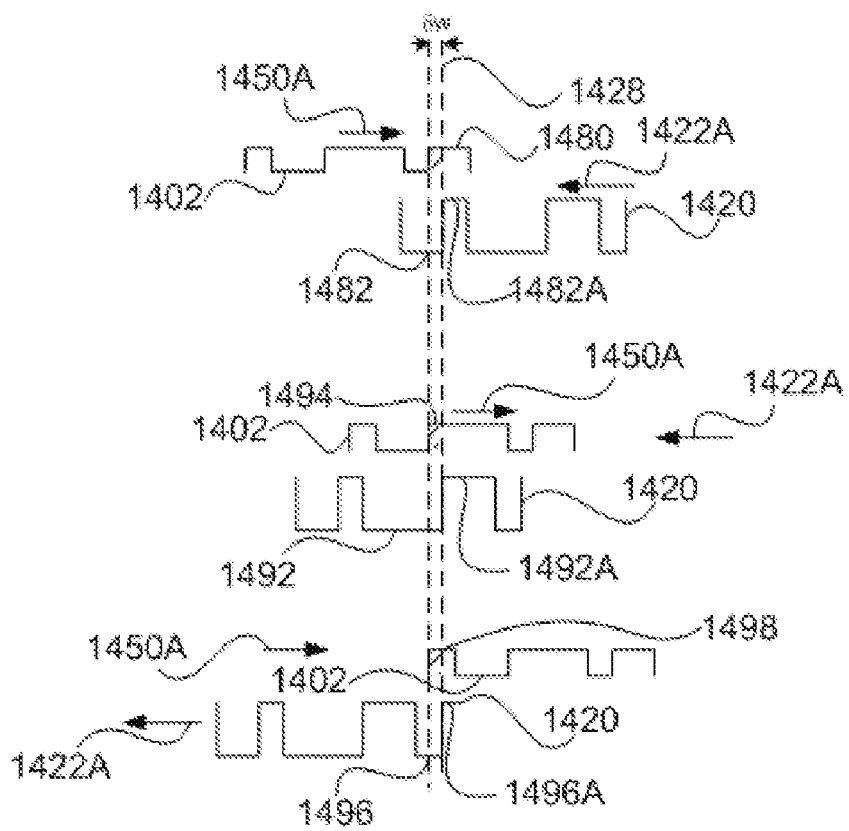
Fig. 12a
Fig. 12b
Fig. 12c
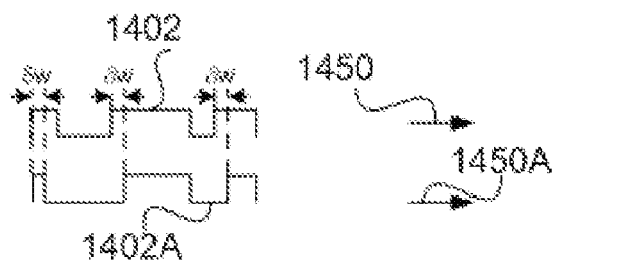
Fig. 13

PHASE WAVELENGTH AND POLARIZATION INSENSITIVE OPTICAL DEVICES

BACKGROUND—CROSS-REFERENCE TO RELATED APPLICATION

This patent issued from an application that claims priority of now abandoned provisional patent application Ser. No. 60/734,143, filed Nov. 7, 2005

BACKGROUND—FIELD

Optical signal processing devices include optical communication devices and systems, optical computing devices and systems, including optical gating devices, optical chopping devices and systems, optical wavelength-conversion devices and systems, and optical bistable devices and systems for optical conversion of modulation formats.

BACKGROUND—PRIOR ART

The field of optical communication and computing has a strong demand for optical devices such as optical choppers, wavelength converters, and bistable devices. Such devices are used for transmitting and routing optical information for long distances and in metropolitan areas. Optical choppers may be used to correct optical dispersions along fibers that carry the optical information channels. The chopper receives optical pulses and "chops" them to narrow their width. Wavelength converters may be used to change the routing path of optical channels in Wavelength Division Multiplexing (WDM) systems. Bistable devices may be used to optically activate all-optical switches for ultra fast packet routing.

There are many optical choppers, wavelength converters, and bistable devices that are based on the principle of interference between the light waves of the optical signals using either Mach-Zehnder Interferometers (MZI) or Nonlinear Optical Loop Mirrors (NOLM) or both of them. Devices that are based on a MZI structure have a disadvantage which is related to their basic principle of operation that is based on interference and phase shift. This principle inherently makes these devices sensitive to phase drifts. In addition, when those devices are constructed from optical fibers, they are also sensitive to polarization drifts due to the birefringence of the fibers. Accordingly, these devices need to be controlled by closed-loop phase and polarization controllers, making them cumbersome devices that require external controllers, are complicated, are power consuming, and expensive.

Devices that are based on a NOLM structure do not include MZI and are phase-insensitive. However, when those devices are constructed from optical fibers, they are sensitive to polarization drifts due to the birefringence of the fibers. Accordingly, these devices need to be controlled by a closed loop polarization controller. Thus they suffer similar disadvantages as the MZI-based devices, which are associated with the need to control polarization to compensate the polarization drifts.

ADVANTAGES

Accordingly, several advantages of some embodiments are to provide phase and polarization insensitive optical devices including choppers for dispersion correction, wavelength converters, and bistable devices and for converting one modulation format to another. Such devices may be constructed from optical fibers and may be manufactured on an optical chip using Planar Circuit (PLC) techniques. Other advantages of various embodiments will become apparent from the ensuing description and accompanying drawings.

SUMMARY

In one embodiment, an all-optical device provides optical chopping, reshaping, and dispersion correcting. The device includes an optical loop having first and second terminals and including first and second nonlinear elements. The optical loop is arranged to receive, at the first and the second terminals a pulse-modulated signal and a continuous beam, respectively. The optical loop is arranged to cause the pulse-modulated signal and the continuous beam to counter-propagate in the optical loop and to produce in the first nonlinear element an inverted pulse-modulated signal. The signal has modulation which is inverted with respect to the pulse modulation of the pulse-modulated signal. The optical loop is also arranged to cause the inverted pulse-modulated signal to chop the pulse-modulated signal in the second nonlinear element.

DRAWINGS

Figure 2:
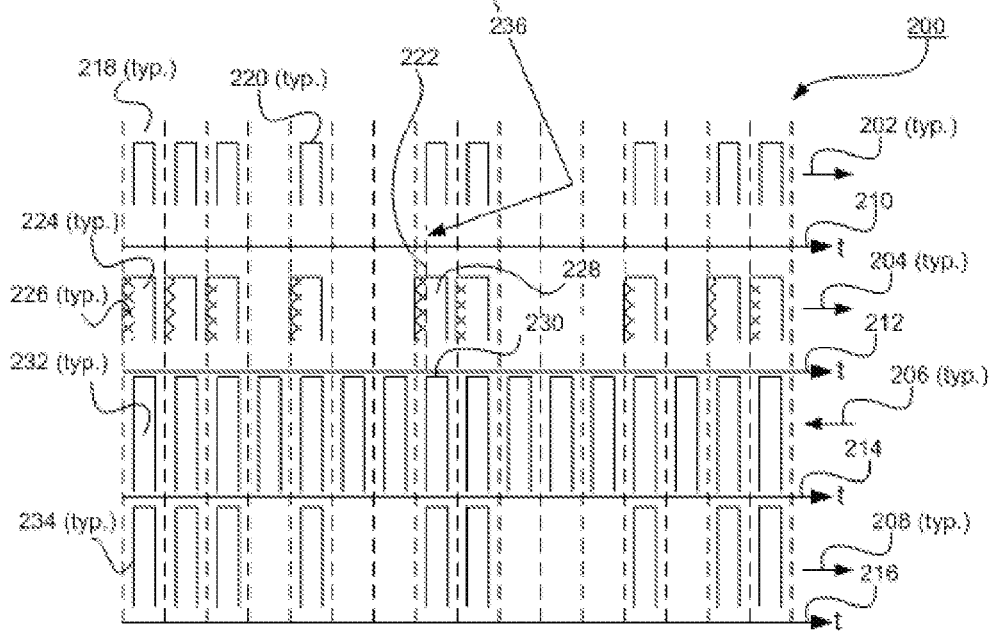

FIG. 2 schematically illustrates a stream of optical signals in their various forms, including an original form, a broader form after dispersion, and a corrected form after the correction of the dispersions using optical chopping.

Figure 3:
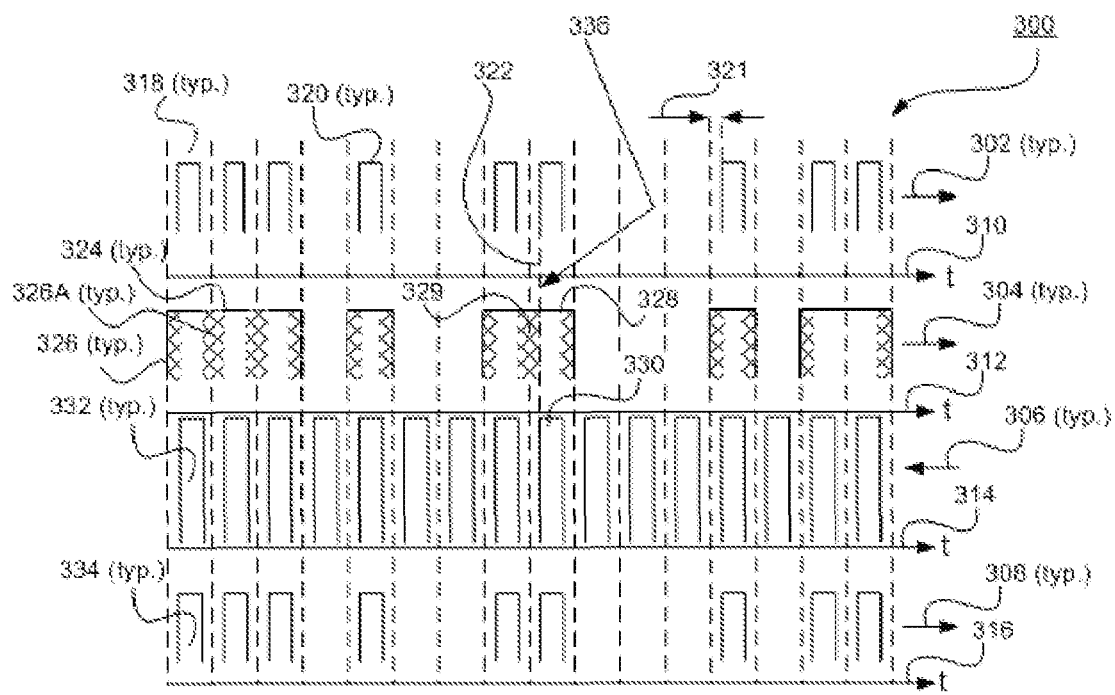

FIG. 3 schematically illustrates a stream of optical signals in their various modulation formats, including an original Non-Return-to-Zero (NRZ) modulation format and a converted Return-to-Zero (RZ) modulation format produced by optical chopper.

Figure 4A:
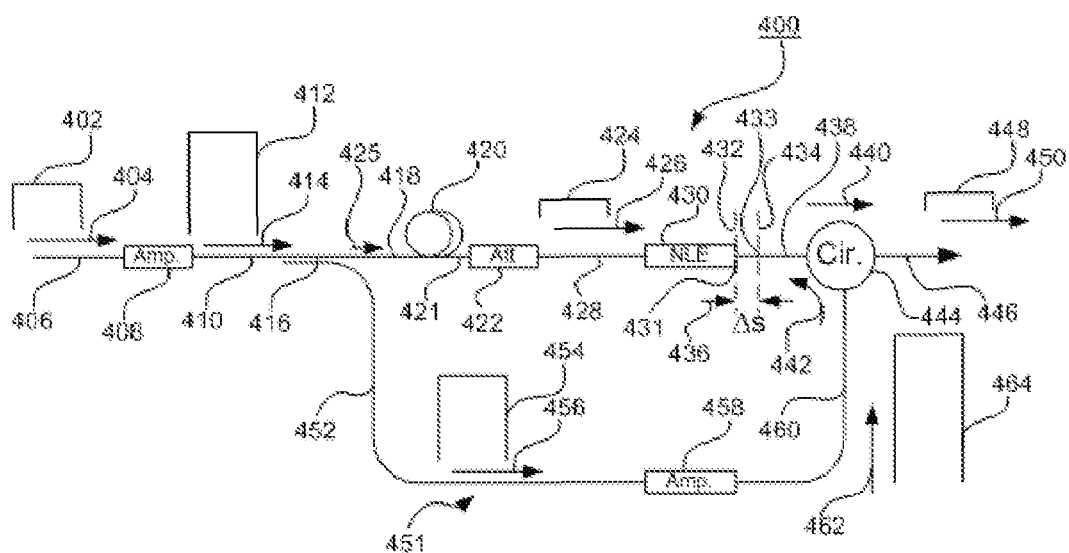

FIG. 4a is a schematic illustration of an optical chopper.

Figure 4B:
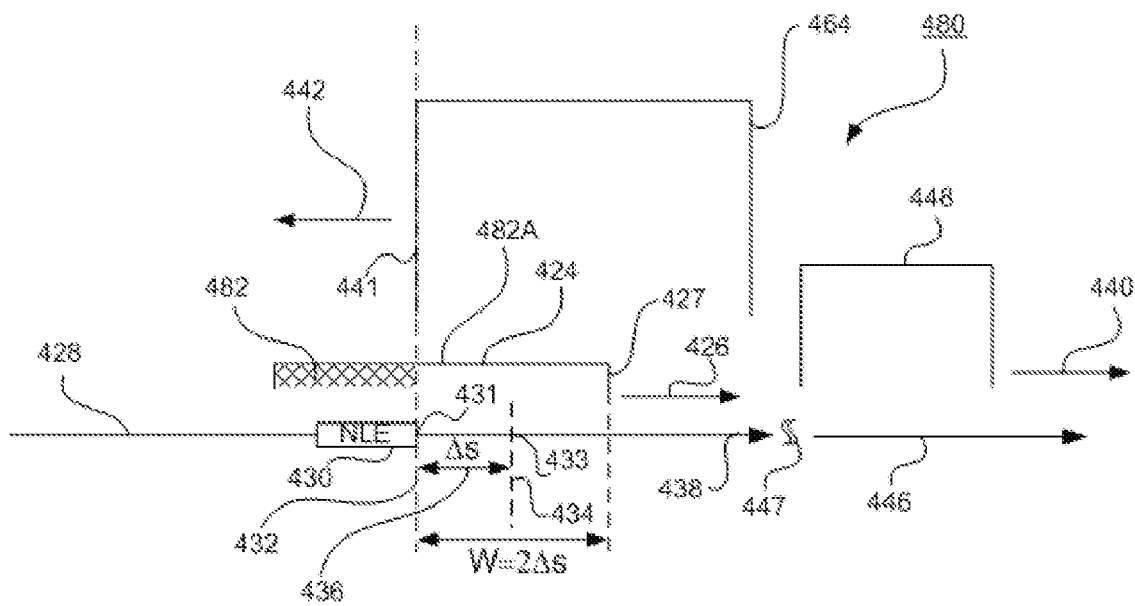

FIG. 4b is a schematic illustration of the optical signals propagating in the optical chopper of FIG. 4a.

Figure 5:
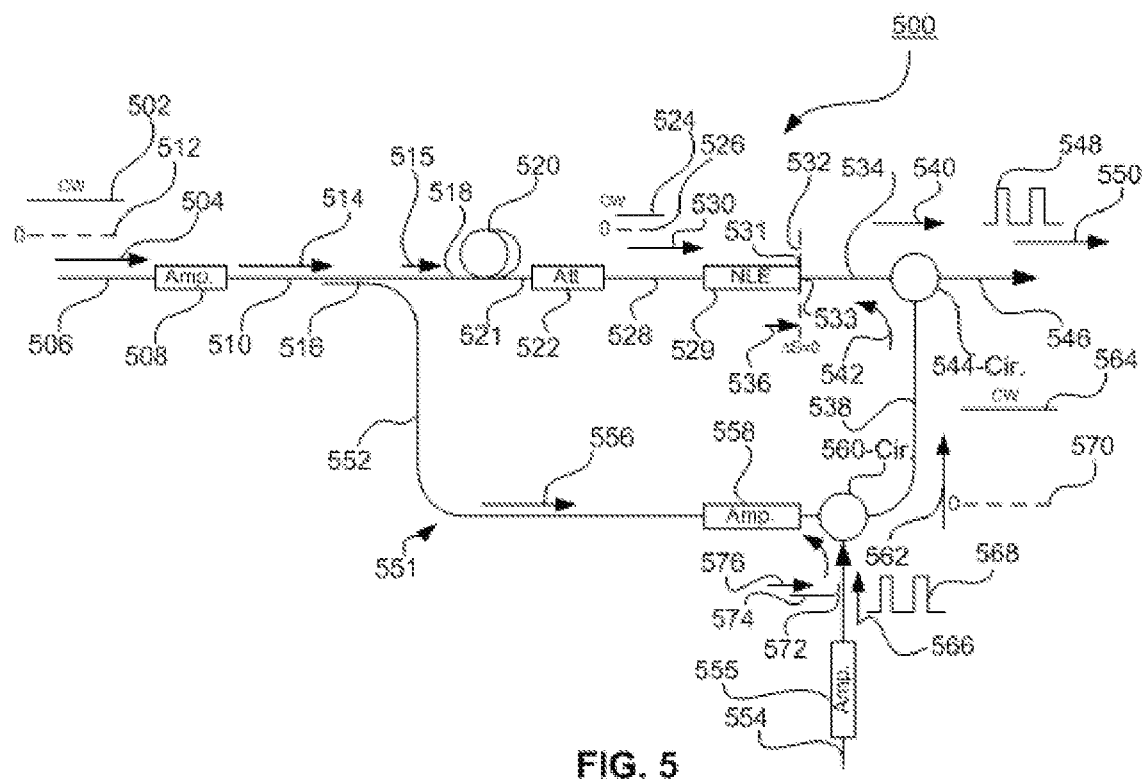

FIG. 5 is a schematic illustration of an optical wavelength converter that may be operated as a regenerator and an optical threshold device as well.

Figures 6, 7A:
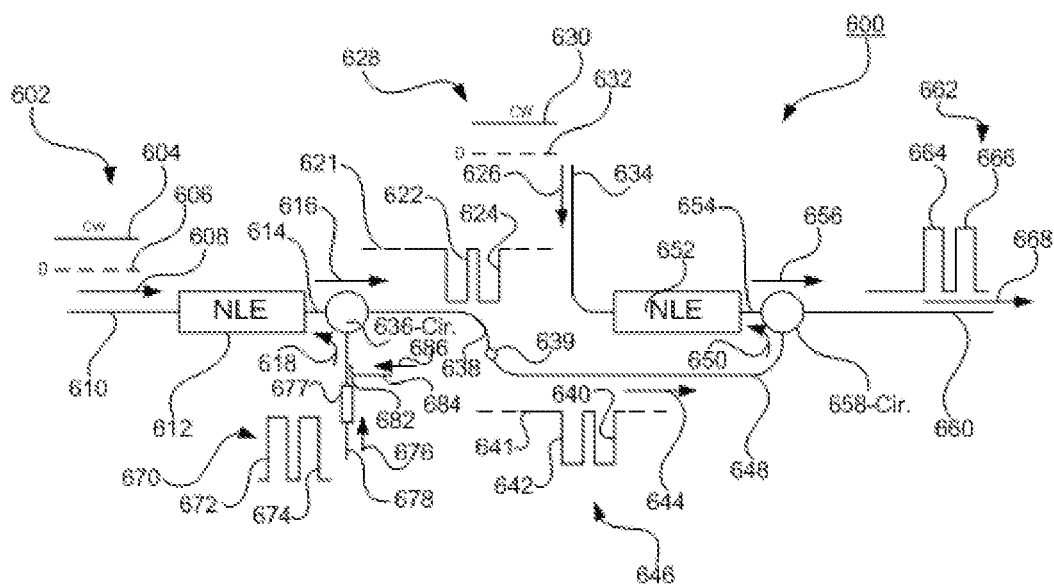

FIG. 6 shows a schematic illustration of an alternative optical wavelength converter that may be operated as a regenerator and an optical threshold device.

FIG. 7a schematically illustrates an alternative optical chopper.

Figure 7B:
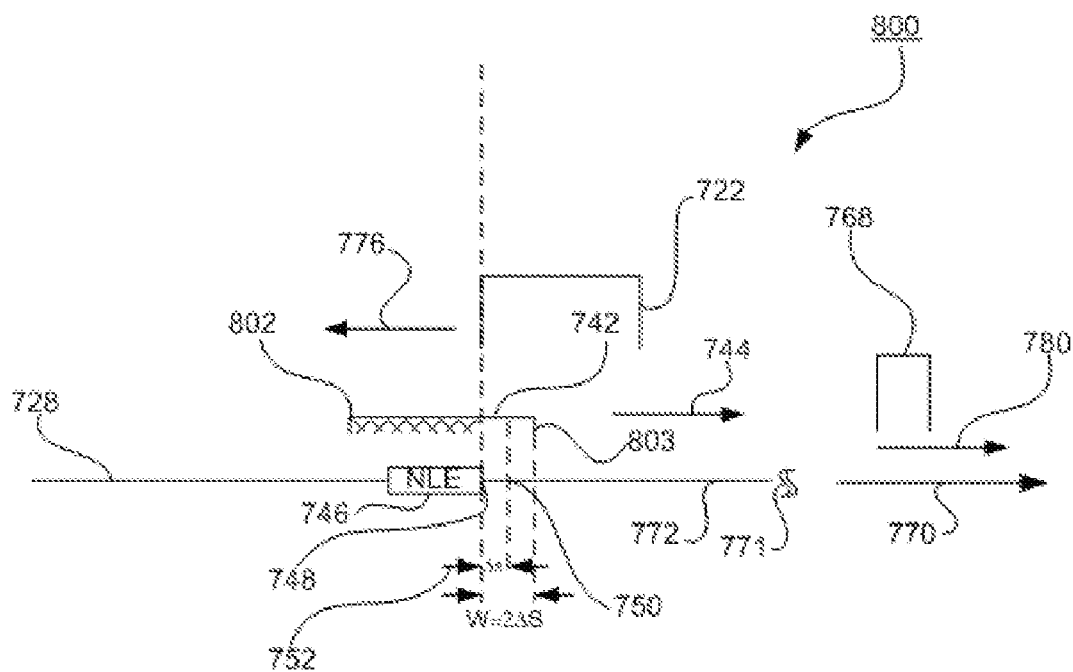
Figure 7C:
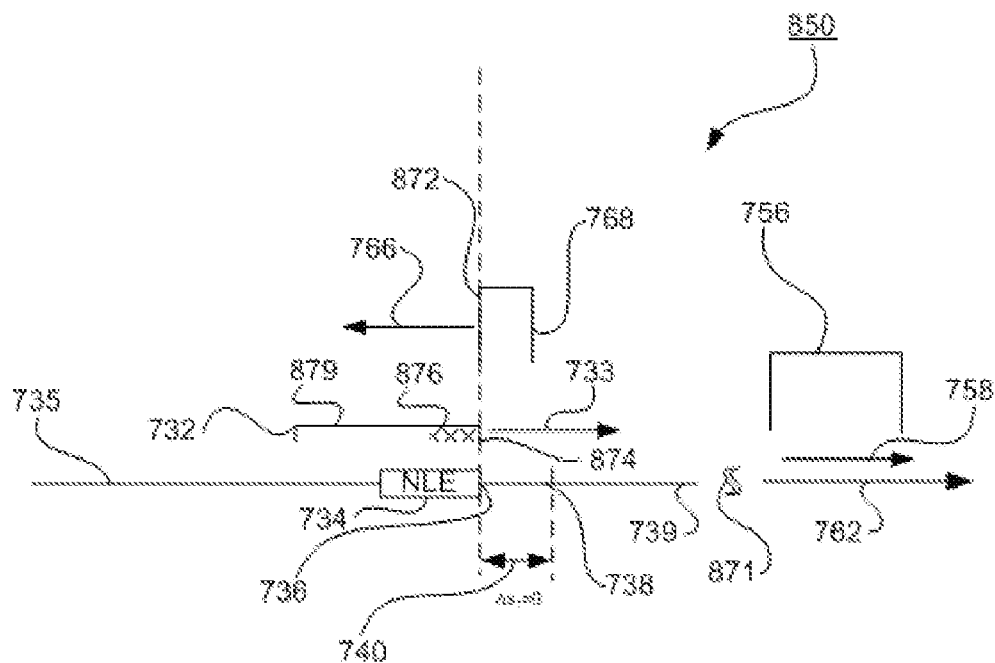
Figure 7D:
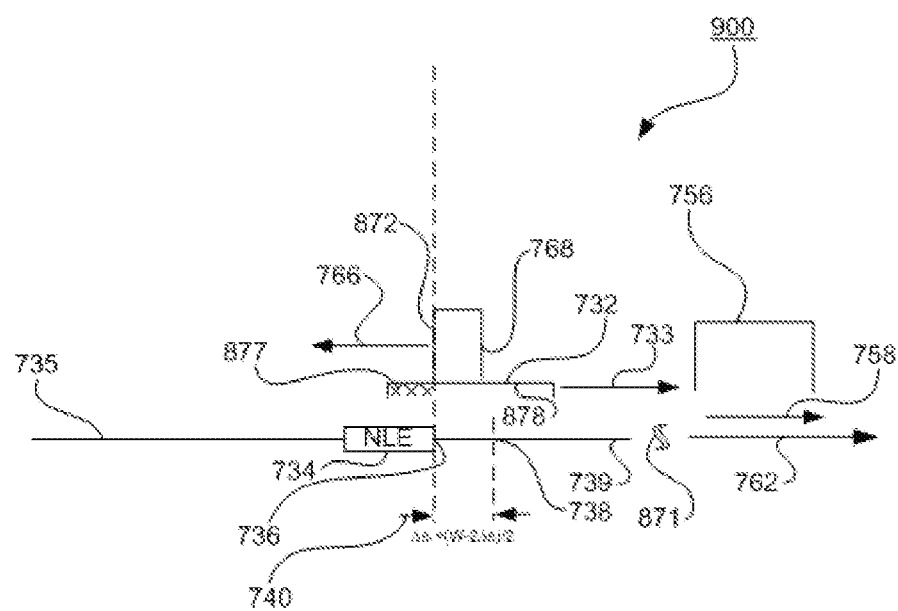

FIGS. 7b, 7c and 7d are schematic illustrations of the optical signals propagating in the optical chopper illustrated by FIG. 7a.

Figure 8:
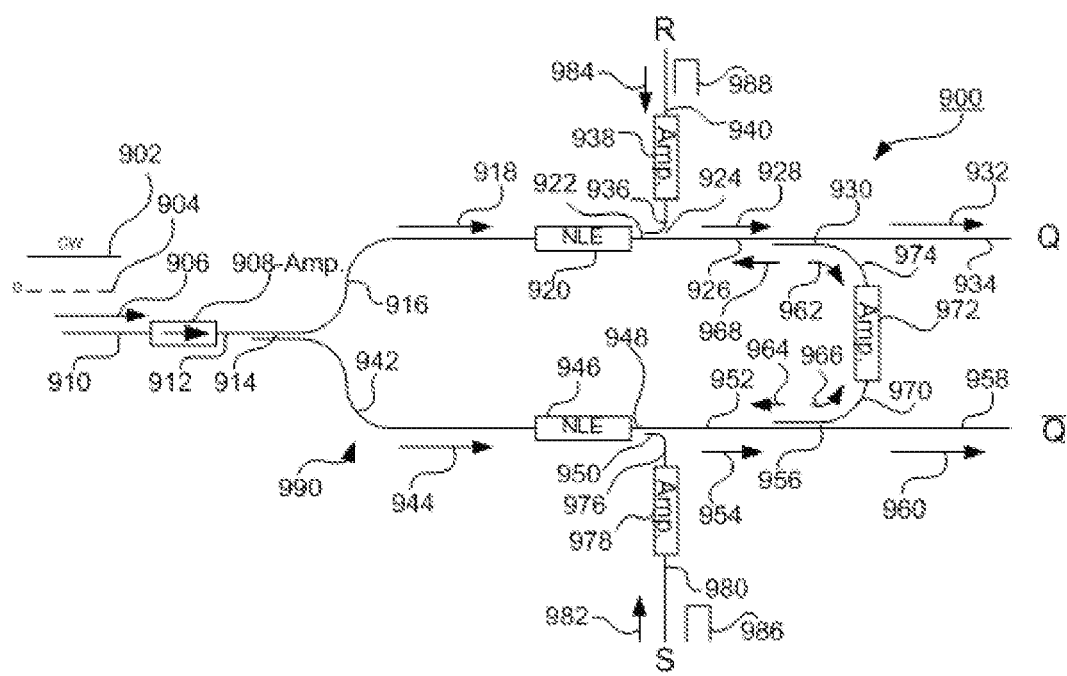

FIG. 8 shows an illustrative optical bistable device.

FIGS. 9a-9g shows an alternative illustrative architecture for optical choppers.

Figure 10:
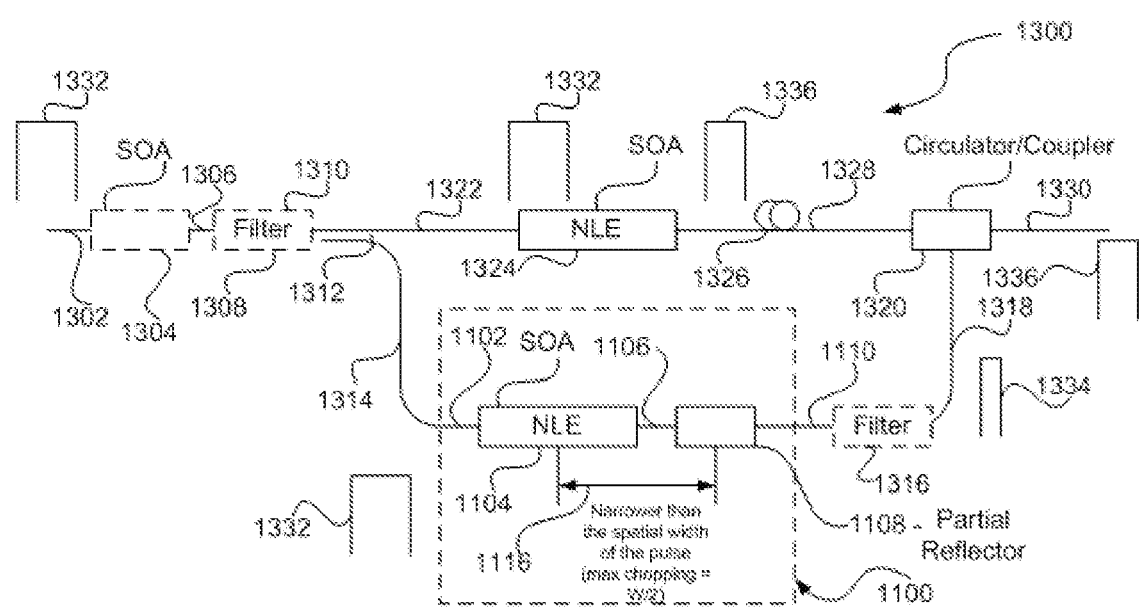

FIG. 10 is a schematic illustration of alternative optical chopper architecture.

FIGS. 11a-11d illustrate additional alternative optical chopper architecture with optical signals at different times and locations in the chopper.

FIGS. 12a-12c shows the signals of the chopper of FIG. 11a at different time sequences.

FIG. 13 illustrates a chopped signal produced by the chopper of FIG. 11a.

Figure 14A:
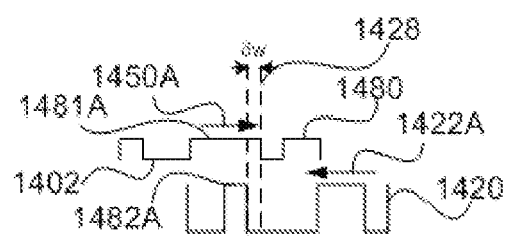
Figure 14B:
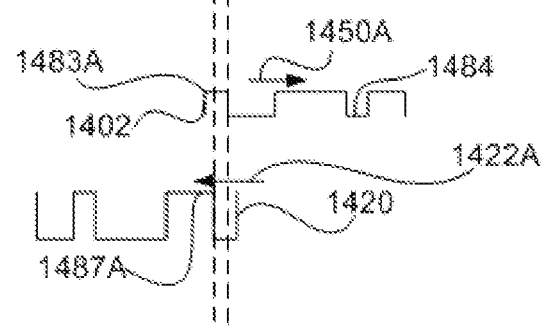

FIGS. 14a and 14b illustrate the signal produced in the chopper of FIG. 11a.

Figure 15:
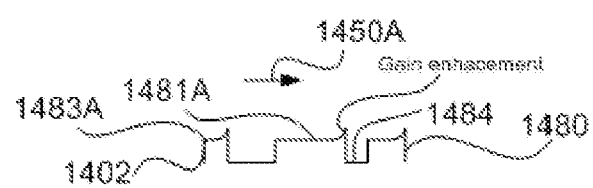

FIG. 15 shows another signal produced at the chopper of FIG. 11a.

Figure 16:
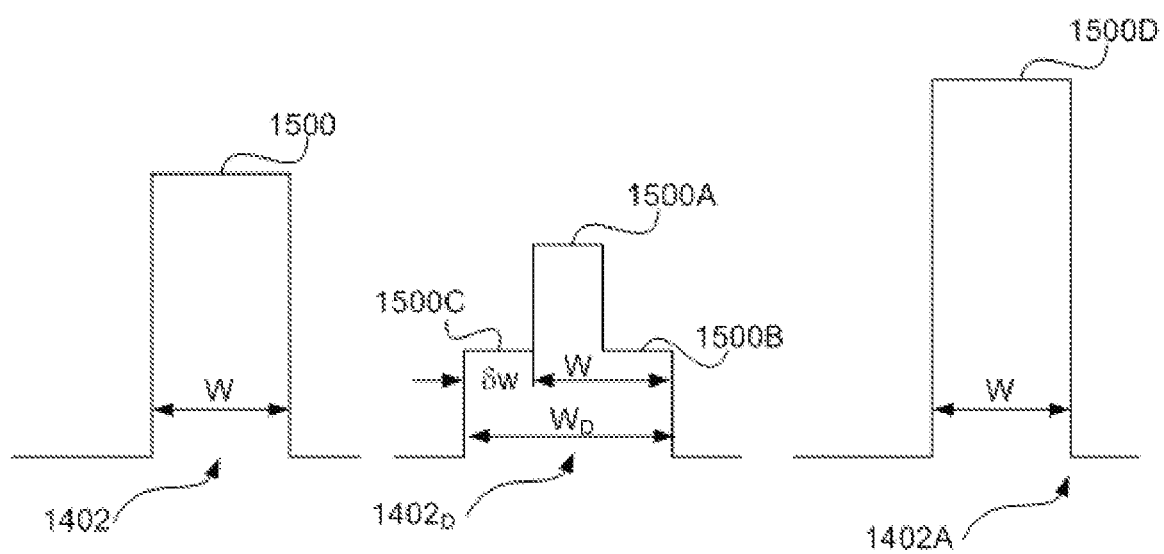

FIG. 16 is a wave diagram that illustrates the way that the chopper of FIG. 11a is used to correct dispersions.

ABBREVIATIONS AND SYMBOLS

WDM—Wavelength Division Multiplexing
NOLM—Non-linear Optical Loop Mirrors
RZ—Return-to-Zero
SOA—Semiconductor Optical Amplifier
CD—Chromatic Dispersions
PLC—Planar Circuits
R—Reset
ASE—Accumulated Spontaneous Emission
(typ.)—Typical
λ—Wavelength
CW—Continuous Wave
MZI—Mach-Zhender Interferometers
NRZ—Non-Return-to-Zero
NLE—Non Linear Element
EDFA—Erbium doped fiber amplifier
PMD—Polarization Mode Dispersions
SNR—Signal-to-Noise-Ratio
S—Set
GRIN—Graded Index
ΔS and ΔL—Displacement distances
δ—A small change
XGM—Cross Gain Modulation

DESCRIPTION—EXEMPLARY EMBODIMENTS—FIG. 1—Chopping By External Signal

Following is detailed description of exemplary embodiments of substantially phase and polarization insensitive optical choppers, wavelength converters, and bistable devices, including various structures, embodiments, and modes of operation.

Figure 1A:
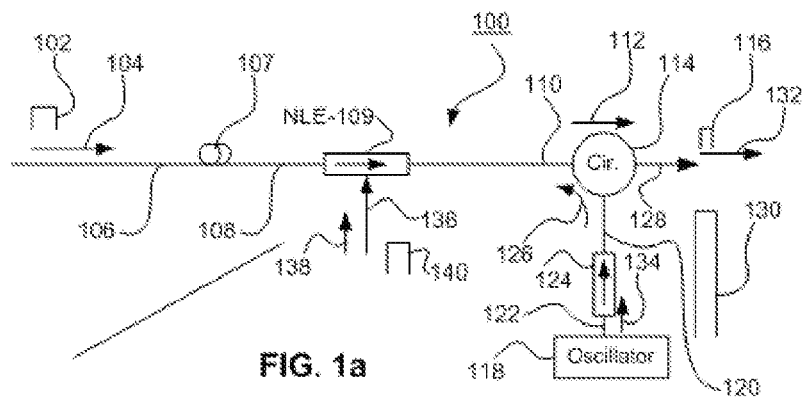
FIG. 1a is a schematic illustration of an optical chopper.

FIG. 1a schematically illustrates a substantially phase and polarization insensitive optical chopper 100. Chopper 100 receives optical signals at its input and chops these pulses to produce optical signals at its output, which are narrower than the pulses received. Chopper 100 is useful for dispersion correction, i.e., for chopping pulses broadened by dispersion back into their original width.

Figure 1B:
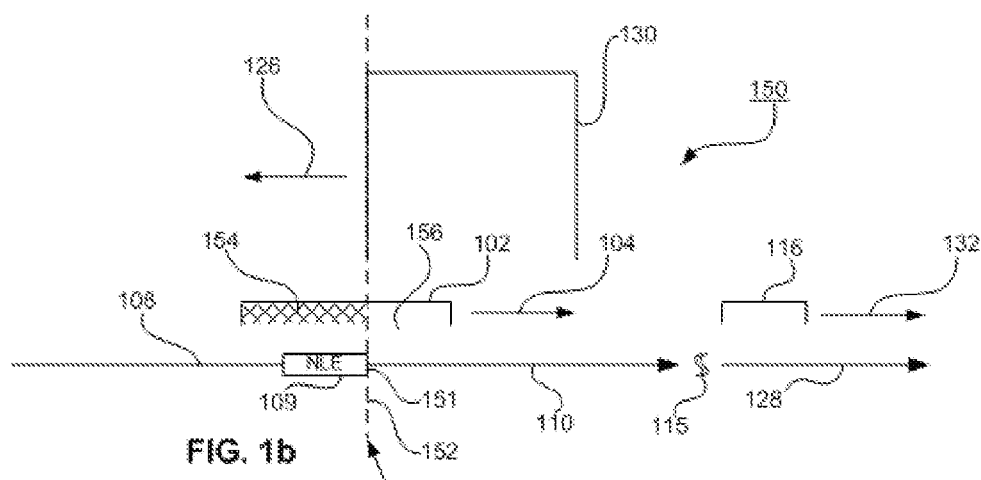
FIG. 1b is a schematic illustration of the optical signals propagating in the optical chopper of FIG. 1 around the vicinity of the nonlinear element.

FIG. 1b schematically illustrates the propagation of optical pulses 102 and 130 with respect to Non Linear Element (NLE) 109 of chopper 100. NLE 109 may be an optical amplifier, such as solid-state optical amplifier, semiconductor optical amplifier (SOA), or Erbium-doped fiber amplifier (EDFA). NLE 109 is connected to optical circulator 114. An input signal 104, which is an optical pulse 102, propagates in optical guide 106 that includes an optical delay line 107, which is a variable delay line. Signal 104 propagates via optical delay line 107 to enter port 108 of NLE 109, gets amplified or suppressed inside NLE 109 as discussed below in detail, and emerges at port 110 of NLE 109.

The signal from port 110 is then transmitted by circulator 114 as signal 112 that appears as signal 132 at port 128 and has the form of an optical pulse 116. NLE 109 includes an optical isolator which is used to prevent any signal from propagating back into an optical source (not shown), that is connected at the input of optical guide 106. Control signal 134, which is in the form of an optical pulse 130, propagates along port 122 through optional optical amplifier 124 to emerge at port 120 of circulator 114 as signal 126. Circulator 114 is used as a directing device to efficiently transmit signal 112 from port 110 to port 128 and to transmit signal 126 from port 120 to port 110. However, other components, such as, couplers, directional couplers, Y-junction couplers, and beam splitters, may be used to replace circulator 114 as a directing device.

All the components shown in FIG. 1a and in the other figures of the application are well known and commercially available.

Use of Circulator to Reduce Loss—FIG. 1

Control signal 134 is provided by an external remote source or unit (not shown) 118 that is a pulse generator, external source, a local oscillator or other unit that provides clock signals. If a directing device other than circulator 114 is used in chopper 100, port 122 may include an optical isolator to block optical radiation from propagating towards unit 118 or other external sources (not shown). Such an optical isolator is included in optical amplifier 124, which is included in port 122. Signal 134 propagates along port 122 through optical amplifier 124 to exit at port 120 for propagating through circulator 114, whereafter it enters NLE 109 via line or port 110. After undergoing amplification or suppression inside NLE 109, signal 126 then exits at port 108 and preferably is blocked by an isolator that is included in NLE 109. As described above, both port 108 and port 110 of NLE 109 serve as input and output ports, and are referred to hereafter as I/O port 108 and I/O port 110, respectively. As an example and without any limitations, we will also refer to I/O input and output ports.

In the absence of control signal 134, which may be a pulse 130 at port 122, NLE 109 works under its normal operating condition in which no chopping of the input signal occurs. During normal operation, input signal 104 enters NLE 109 at port 108 and is amplified by NLE 109 with a gain factor G. Signal 104 reaches saturation to become $P_{sat}$ and emerges at I/O port 110 as signal 112. Signal 112 propagates through circulator 114 and finally exits as signal 132 at port 128 of circulator 114. Under normal operating conditions when there is no control signal 134, chopper 100 performs in its "non-chopping" state for input signal 104 with amplification G provided by NLE 109.

When control signal 134 is applied to port 122, it propagates through circulator 114 as signal 126 and enters NLE 109 at I/O port 110. Input signal 134 is set to be strong enough to effectively drive NLE 109 into deep saturation. Optical amplifier 124 is included in terminal 122 to ensure that that signal 126 have the power needed to drive NLE 109 into the desired saturated state. When NLE 109 is saturated, its saturation output power $P_{sat}$ is fixed and does not increase with the increase of total input power, $P_1$ and $P_2$, received at I/O ports 108 and 110, respectively. The input power PI received at I/O port 108 is transmitted, by saturated NLE 109, into I/O port 110 as output power $P_{o1}$. Similarly, the input power $P_2$ received at I/O port 110 is transmitted, by saturated NLE 109, into I/O port 108 as output power $P_{o2}$. If signals 104 and 126 (or part of them) propagate simultaneously through NLE 109, the saturated output power $P_{sat}$ is distributed proportionally between output powers $P_{o2}$ at I/O port 110 and $P_{o2}$ at I/O port 108, in proportion to the respective input powers $P_1$ and $P_2$. As a result, output power $P_{o2}$ at port 108 may be given by equation $$P_{sat} \cdot \frac{P_2}{P_1 + P_2}.$$

Cross Gain Modulation—FIG. 1

When there is no control signal 134, $P_2$ is zero, and $P_{o1}$ may reach a level up to saturation output of $P_{sat}$, depending upon the level of input power $P_1$ of input signal 104. When $P_2$ is applied to port 122, with timing that causes signals 104 and 126 (or part of them) to propagate simultaneously through NLE 109, $P_{o1}$ is smaller than $P_{sat}$ by $$\frac{P_2}{P_1 + P_2}.$$

When the power $P_2$ of control signal 134 is much larger than the power $P_1$ of input signal 104, only a small fraction of the total saturated output power $P_{sat}$ is contributed toward $P_{o1}$, emitted from I/O port 110. The intensity of signal 132 at output port 128 of chopper 100 equals $P_{o1}$ less the insertion loss of circulator 114. The ratio in the intensity of signal 132 between existence and non-existence of control signal 134 is substantially larger than one $$\left(\frac{P_2 + P_1}{P_2} \gg 1\right),$$

and is larger than 6 dB. Accordingly, when NLE 109 is deeply saturated, the amplitude of the signal that it transmits from port 110 is greatly reduced to produce a close-to-zero signal level to exit at port 128. Correspondingly, chopper 100 acts in its "shut" state with regard to input signal 104.

Under specific relationships between pulses 102 and 130, such as the relationships illustrated by FIG. 1b (discussed below) in which only part of pulses 102 and 130 propogate simultaneously through NLE 109, the "shut" state of chopper 100 is a "chop, or cut" state in which the amplification of NLE 109 is greatly reduced.

When control signal 134 is a single pulse 130 or a series of such optical pulses, the suppression period of output 128 is controlled by the pattern of activating optical pulses 130, their arrival time to NLE 109, and the arrival time of pulses 102 at NLE 109.

The saturation of NLE 109 depends mainly upon the optical intensity of control signal 134 and is not affected by any phase information of optical signal 104, or in other words, by the phase relationship between the electric fields of optical signal 104 and control signal 134. Therefore, device 100 is a phase-insensitive optical chopper. The ability to operate chopper 100 by control signal 134, which is in the form of a single pulse 130 or any other modulated stream signal 134, on a single pulse basis makes chopper 100 substantially protocol transparent and insensitive to the pulse pattern of input signal 104.

The saturation of NLE 109 depends mainly upon the optical intensity of the control signal 134, whether it counter-propagates inside NLE 109 against input signal 104, as described in the exemplary embodiment above, or whether it co-propagates inside NLE 109 along with input signal 104, if launched through port 108 as well.

When NLE 109 is a polarization-insensitive component that operates under deep saturation due to activating signal 134, a close-to-zero signal level of input signal 104 exits as output signal 132 at output port 128 regardless the state of polarization of input signal 104. Therefore, chopping device 100 is a substantially polarization-insensitive gating device.

The operating condition of NLE 109 is affected by the electrical current injected to NLE 109 via electric port 136, which may include an electric signal 138 that may be a pulse 140. In other words, NLE 109 may be driven into "chop or cut" state by electric control pulse 140 supplied to control terminal 136 to achieve similar results produced by launching optical control pulse 130 via terminal 122.

Sequence of Chopping—FIG. 1b

FIG. 1b is a schematic illustration of a part of chopper 100 of FIG. 1a. FIG. 1b shows pulses 102 and 130 of signals 104 and 126, arriving at NLE 109 from opposite directions via I/O ports 108 and 110, respectively. The relative position of pulses 130 and 102 with respect to NLE 109 depends upon the delay of optional optical delay line 107 (shown in FIG. 1a) and the timing at which pulses 102 and 130 are supplied to ports 106 and 122 (shown in FIG. 1a), respectively.

At the time when pulse 130 enters NLE 109 at its edge 151 on line 152, part 156 of pulse 102 has already exited from NLE 109. Assume pulse 130 is not narrower than the time interval 154. From this time until pulse 102 completely exits from NLE 109, portion 154 of pulse 102 (having lower intensity than pulse 130) propagates in NLE 109 with the presence of pulse 130. As discussed above, when the portions of pulses 102 and 130 propagate simultaneously through NLE 109, the portion of pulse 102 is suppressed significantly and may even be reduced into the baseline level of pulse 102. Accordingly, portions 156 and 154 of pulse 102 are amplified and suppressed by NLE 109 by factors G and $$\frac{P_2 + P_1}{P_2} \gg 1,$$

respectively, when $P_1$ and $P_2$ are the intensities of pulses 102 and 130 at I/O terminals 108 and 110, respectively.

This means that portion 154 of pulse 102 is suppressed to a very low intensity level and practically is chopped from pulse 102. Another portion 156 of pulse 102 is amplified and appears at port 128 as amplified signal 132 in the form of chopped pulse 116. FIG. 1b includes an illustration of discontinuity 115 which represents circulator 114 of FIG. 1a and other parts of FIG. 1a between ports 110 and 128 that are not illustrated by FIG. 1b.

Amount of Chopping As Function of Relative Position of Pulses—FIG. 1b

The amount of chopping of pulse 102 is equal to the width of portion 154. The width of the other portion of pulse 102 that appears at port 128 as chopped pulse 116 is equal to the width of portion 156. The width of portion 154 depends upon the relative position between pulses 102 and 130 with respect to NLE 109 and equals the remaining portion of pulse 102 that did not yet exit NLE 109 at the time in which pulse 130 arrives at edge 151 of NLE 109. This means that the process of chopping starts when pulse 130 enters edge 151 of NLE 109 while portion 154 of pulse 102 did not yet exit NLE 109. The amount of chopping of pulse 102 may be adjusted by adjusting the width of portion 154. The width adjustment of portion 154 is done by varying the relative arrival times of pulses 102 and 130 to NLE 109. This is done by adjusting the relative time delay by which pulses 102 and 130 are supplied to ports 106 and 122, respectively, (see FIG. 1a) and/or by adjusting the delay of optional optical delay line 107 to delay the arrival time of pulses 102 relatively to the time pulse 130 arrives at NLE 109. The arrival time of pulse 102 relative to the arrival time of pulse 130 determines the width of portion 154 of pulse 102 that did not yet exit NLE 109 at the time in which pulse 130 arrives to edge 151 of NLE 109.

For many applications the length of NLE 109 is much shorter than the spatial width of pulses 102 and 130. Thus, for such applications, line 152 indicates the position from which pulse 130 starts to suppress the intensity of pulse 102. Accordingly, line 152 may be positioned at any location along NLE 109 for practically achieving similar results.

While FIGS. 1a and 1b illustrate information signal 104 and control signal 126 (or 134) as being counter-propagating through NLE 109, they may be co-propagating as well. In case that signals 104 and 126 are co-propagating signals they may have different wavelengths to allow the separation of the control signal from the chopped signal using a wavelength separating device at port 128. The use of different wavelengths for information signal 102 and control signal 126 (134) may be applied also to the co-propagating configuration of chopper 100 illustrated by FIGS. 1a and 1b.

Pulses 130 and 102 of control signal 126 and information signal 104, respectively, may have the same width or have different widths.

Dispersion Correction of Pulses with RZ Modulation Format—FIG. 2

FIG. 2 is waveform diagram 200 demonstrating exemplary use of chopper 100 of FIG. 1a as a dispersion corrector that chops pulses broadened by dispersions back into their original width. The dispersion correction is performed on a stream signal 204 which is the original information stream signal 202 that whose pulses 220 (typ.) were broadened by amount 226 (typ.; illustrated in cross hatching) due to dispersions such as Chromatic Dispersions (CD) and/or first and second orders Polarization Mode Dispersions (PMD) to form pulses 224 (typ.) of stream signal 204. (The notation "(typ.)," when it accompanying a reference numeral indicates that the numeral represents several related parts, components, signals, or features.

Stream signal 202 is the original information stream signal prior to the broadening of its pulses 220 (typ.) by dispersions.

Four stream signals 202, 204, 206, and 208 on respective time axes 210, 212, 214, and 216 indicate the time t. Pulses 220 (typ.), 224 (typ.), 232 (typ.), and 234 (typ.) of respective stream signals 202, 204, 206, and 208 are positioned in time slots 218 (typ.) which are common to stream signals 202, 204, 206, and 208.

Stream signals 202, 204, 206, and 208 are illustrated as propagating along their respective arrow signals 202, 204, 206, and 208 in a region corresponding to NLE 109 of FIGS. 1a and 1b. Stream signal 202 is the original stream signal modulated by RZ modulation format and its pulses 220 (typ.) are shown prior to their broadening by dispersions. Stream signal 204 is the original information stream signal 202. Its pulses 220 (typ.) were broadened by dispersions by an amount 226 (typ.) each, to form broad pulses 224 (typ.) of stream signal 204. Stream signal 204 corresponds to signal 104 at port 106 of FIG. 1a or to signal 104 at NLE 109 of FIG. 1b. Stream signal 206 is a periodic control signal corresponding to control signal 134 at port 122 of FIG. 1a or to signal 126 at NLE 109 of FIG. 1b.

Control stream signal 206 counter-propagates to signal 204, as indicated by the direction arrows in FIG. 2. The arrival times of stream signals 204 and 206 to NLE 109 of FIG. 1b are adjusted to produce chopping of pulses 224 (typ.) in an amount which is equal to the broadening amount 226 (typ.) of pulses 224 (typ.), caused by the dispersion. Such chopping narrows broadened pulses 224 (typ.) back into their original width, which is equal to the width of original pulses 220 (typ.) and thus corrects the dispersions. This means that the arrival times of stream signals 204 and 206 to NLE 109 of FIG. 1b should be adjusted to produce portions of pulses 224, such as portion 154 of pulse 102, illustrated by FIG. 1b, having a width similar to the broadening amount 226 (typ.).

Arrows 236 point to lines 152 of FIG. 1b and 222 of FIG. 2. These lines represent the same location in both figures. Line 222 corresponds to line 152 of FIG. 1b and indicates the edge of NLE 109 of FIG. 1b. This means that pulses 224 (typ.), such as pulse 228 of signal stream 204, meet high intensity control pulses 232 (typ.), such as pulse 230 of signal stream 206, at NLE 109 in a relative position that is similar to the relative position of pulses 102 and 130 of FIG. 1b, respectively. Broadened parts 226 (typ.) of pulses 224 (typ.) corresponding to portion 154 of FIG. 1b are chopped by gain suppression in NLE 109. Thus pulses 224 (typ.) are chopped into the original width of pulses 220 (typ.) and appear as pulses 234 (typ.) of stream signal 208 at port 128 of FIG. 1a. Pulses 234 (typ.) of stream signal 208 are pulses whose dispersions have been corrected by chopping. The intensity of pulses 234 (typ.) of stream signal 208 preferably is amplified by NLE 109 of FIGS. 1a and 1b.

For time slots 218 (typ.) which are not occupied by pulses 224 (typ.) of stream signal 204, no chopping is performed by pulses 232 of control stream signal 206. Since control stream signal 206 is counter-propagating to stream signal 204, no signal is produced for stream signal 208 in time slots 218 (typ.) at port 128 of FIGS. 1a and 1b. Thus stream signal 234 occupies, by pulses 234 (typ.), the same time slots 218 (typ.) that stream signal 204 (or 202) occupies by pulses 224 (typ.) (or 220 (typ.)).

Conversion of NRZ Modulation Format to RZ Modulation Format—FIG. 3

FIG. 3 is a waveform diagram demonstrating exemplary use of chopper 100 of FIG. 1a as a modulation converter for converting the NRZ modulation format to the RZ modulation format. The modulation conversion is performed on stream signal 304, which is in the NRZ modulation format. Stream signal 304 represents the same information as stream signal 302 modulated according to the RZ modulation format. Stream signal 302 serves as a reference to compare the results of the modulation conversion of stream signal 304 from the NRZ to the RZ modulation format as appears in stream signal 308. Accordingly, stream signals 302 and 308 should carry the same information modulated according to the RZ modulation format.

FIG. 3 illustrates four stream signals 302, 304, 306, and 308 with their respective time axes 310, 312, 314, and 316 indicating time t. Pulses 320 (typ.), 324 (typ.), 332 (typ.), and 334 (typ.) of respective stream signals 302, 304, 306, and 308 are positioned in time slots 318 (typ.) which are common to steam signals 302, 304, 306, and 308. Pulses 320 (typ.), 332 (typ.), and 334 (typ.) are in the RZ modulation format and occupy only part of time slots 318 (typ.) while pulses 324 (typ.) are in the NRZ modulation format and occupy the whole space of time slots 318 (typ.). As may implied by the NRZ modulation format, if pulses 324 are arranged in a form of several adjacent pulses they may appear as one wider pulse that occupies several time slots 318 (typ.).

Stream signals 302, 304, 306, and 308 are illustrated as propagating along their respective arrow signals 302, 304, 306, and 308 in a region corresponding to NLE 109 of FIGS. 1a and 1b. Stream signal 302 is the reference signal stream. Its pulses 320 (typ.) are modulated according to the RZ modulation format. Stream signal 304 is the information signal stream. Its pulses 324 (typ.) are modulated according to the NRZ modulation format and represent the same information carried by reference stream signal 302. Stream signal 304 corresponds to signal 104 at port 106 of FIG. 1a or to signal 112 at NLE 109 of FIG. 1b. Stream signal 306 is a periodic control signal corresponding to control signal 134 at port 122 of FIG. 1a or to signal 126 at NLE 109 of FIG. 1b.

Control stream signal 306 counter-propagates to signal 304. The arrival times of information stream signals 304 and control stream signal 306 to NLE 109 of FIG. 1b are adjusted to chop pulses 324 (typ.) such that NLE 109 will convert pulses 324 (typ.) to the form of pulses 334 (typ.). Pulses 334 have the same form as pulses 320 (typ.) Such chopping periodically chops pulses 324 (typ.) by an amount that is equal to spaces 321 (typ.) between two adjacent RZ pulses 320 (typ.) or chops half of spaces 321 (typ.) at the edges of pulses 324 (typ.). The chopping period is equal to the time period of time slots 318 (typ.), which is also equal to the period of control pulses 332 (typ.) of control stream signal 306. Signal 306 has a width which is equal to the width of spaces 321 (typ.).

Arrow 336 pointing to line 322 corresponds to line 152 of FIG. 1b, which indicates the edge of NLE 109 of FIG. 1b. This means that pulses 324 (typ.), such as pulse 328 of signal stream 304, meet high intensity control pulses 332 (typ.) such as pulse 330 of signal stream 306 at NLE 109 in a relative position that is similar to the relative position of pulses 102 and 130 of FIG. 1b, respectively. The chopping starts by gain suppression in NLE 109 (FIG. 1b) at the time that control pulses 330 enter edge 322 corresponding to edge 151 of NLE 109 of FIG. 1b. The amount of chopping is indicated by hatched region 329 in pulse 328 and depends upon the relative arrival times of pulses 324 (typ.) and 332 (typ.) to edge 322 of NLE 109 (not shown) and the amount of overlap between pulses 324 (typ.) and 332 (typ.). Thus the amount of chopping 326 (typ.) (or 329 ) within pulses 324 (typ.) (or pulse 328 ) is equal to the widths of spaces 321 (typ.) and pulses 332 (typ.). The amount of chopping 326 A (typ.) at the edges of pulses 324 (typ.) is equal to half of spaces 321 (typ.) and pulses 332 (typ.). Accordingly, chopped pulses 324 (typ.) appear as pulses 334 (typ.) of stream signal 308 at port 128 of FIG. 1a. Pulses 334 (typ.) of stream signal 308 are, according to the modulated RZ format in the form of pulses 320 (typ.) representing the same information as pulses 324 (typ.) modulated according to the NRZ format. Accordingly, pulses 334 (typ.) of stream signal 308 are the converted RZ modulation format of pulses 324 (typ.) modulated according to NRZ modulation format. The intensity of pulses 334 (typ.) of stream signal 308 may be amplified by NLE 109 of FIGS. 1a and 1b.

For time slots 318 (typ.) which are not occupied by pulses 324 (typ.) of stream signal 304, no chopping is performed by pulses 322 (typ.) of control stream signal 306. Since control stream signal 306 is counter-propagating to stream signal 304, no signal is produced for stream signal 308 in time slots 318 (typ.) at port 128 of FIGS. 1a and 1b. Thus stream signal 308 occupies, by pulses 334 (typ.), the same time slots 318 (typ.) that stream signal 304 (or 202 ) occupies by pulses 324 (typ.) (or 220 (typ.)).

Self Chopping Device for Correcting Dispersions of Pulses with RZ Format—FIG. 4

FIG. 4a schematically illustrates a phase and polarization insensitive optical chopper 400 as an exemplary embodiment. Unlike chopper 100 of FIG. 1a, which is controlled by external signal 134, chopper 400 is a self-chopper and does not need an external signal for its operation. FIG. 4b assists in explaining the principle of operation of chopper 400 of FIG. 4a.

Input signal 404, which may be optical pulse 402, enters input port 406 of optical chopper 400. Port 406 preferably includes an optical amplifier 408. Amplifier 408 preferably includes an optical isolator that may be integrated in amplifier 408 and thus is not separately shown. In such a case, input signal 404 propagates through optional optical amplifier 408, optional optical isolator, and enters as signal 414 that may be a pulse 412 that is delivered to directional coupler 416 via terminal 410. Here, optical amplifier 408 may be used before directional coupler 416 to boost the power level of input signal 404 so that NLE 430 may be properly saturated under certain operation conditions, as is discussed below in detail, and optional optical isolator of amplifier 408 may be used to prevent any loop-back signals from getting back into input port 406.

Input signal 404 is split into two signals, 425 and 456, at directional coupler 416, which has a power splitting ratio of 1:m, divided between output branches 418 and 452 respectively, wherein m may be any positive number. Signal 425 propagates through optional optical delay line 420 into light guide 421 and from there passes through optional attenuator 422 to exit as signal 426, which is a pulse 424 at light guide 428. Signal 426 propagates from guide 428 through NLE 430 to enter circulator 444, via guide 438, as signal 440. Signal 440 appears at output port 446 of chopper 400 as signal 450, which is a pulse 448.

On the other branch 452, signal 456, which is a pulse 454, propagates through optional amplifier 458 to emerge as signal 462, which is a pulse 464 at light guide 460. Signal 462 continues to propagate from guide 460 to pass through circulator 444 as signal 442 emerging from guide 438 to enter NLE 430. Signal 442 passes through NLE 430 and emerges at guide 428 to propagate toward input 406 through attenuator 422, optical delay line 420, coupler 416, and amplifier 408, where signal 442 is blocked by the optical isolator of amplifier 408 to prevent back reflections into input 406.

For proper operation of chopper 400, the intensity of pulse 464 arriving to NLE 430 from guide 438 preferably is higher than the intensity of pulse 424 arriving at NLE 430 from guide 428. To fulfill such a requirement, optional amplifier 458 is used to amplify pulse 454 for producing high intensity pulse 464. Alternatively, optional attenuator 422 is used to attenuate signal 425 for producing pulse 424 having a lower intensity than pulse 464. Alternatively, asymmetric coupler 416 having a splitting ratio of 1:m where m>1 may be used for producing pulse 424 having lower intensity than pulse 464. The use of attenuator 422, amplifier 458, and asymmetric coupler where m>1 is optional and may be used in any combination. I.e., all of them may be used, only part of them may be used or only one of them may be used. In addition, pulse 464, arriving at NLE 430 as signal 442 may have an intensity that is high enough to drive NLE 430 into a saturated state. In case such a high intensity cannot be provided by a fraction of input signal 404, signal 404 may be boosted by amplifier 408.

Circulator 444 is used as a directing device to efficiently transmit signal 440 from port 438 to port 446 and to transmit signal 442 from port 460 to port 438. However, other components, such as couplers, directional couplers, Y-junction couplers, and beam splitters, may be used to replace circulator 444 as a directing device.

NLE 430, attenuator 422, and amplifiers 408 and 458 are optical amplifiers, preferably solid-state optical amplifiers, but also may be semiconductor optical amplifiers (SOA), and Erbium-doped fiber amplifiers (EDFA). Attenuator 422 may be an optical amplifier which is excited into a very low excitation level in which the amplifier has an amplification lower than one and is actually behaves as an attenuating device.

High intensity pulse 464 is a control pulse used to chop lower intensity pulse 424 at NLE 430. Control pulse 464 operates similar to control pulse 134 of copper 100 of FIG. 1. Control signal 134 of chopper 100 of FIG. 1 is a signal that differs from information signal 104 of chopper 100 and may be provided by an external source. However, pulse 464 of chopper 400 of FIG. 4a is a fraction of information signal 404 that may or may not be amplified, depending upon whether amplifier 408 is used or not used. This means that chopper 400 is a self-chopper that does not need an external control signal or any other synchronization mechanism between the information signal and the external signal.

Regardless on the type of the control signal, i.e. control signal 134 external to chopper 100 or a self-control signal 442 of chopper 400, the chopping of information signal 102, by control signal 134 at NLE 109 of chopper 100 (all in FIG. 1), is done in a manner similar to the chopping of information signal 426 by control signal 442 at NLE 430 (all in FIG. 4a). Thus the chopping process of chopper 400 of FIG. 4a, illustrated in FIG. 4b, is similar to the chopping process of chopper 100 of FIG. 1a, illustrated in FIG. 1b.

Line 434 is an optical midpoint 433 of loop 451 associated with terminals 418 and 452 of coupler 416. This means that the optical path (time for an optical signal to propagate) from coupler 416 to point 433 on line 434 via branch 452 is equal to the optical path from coupler 416 to point 433 via branch 418. Edge 431 of NLE 430, on line 432, is displaced from optical midpoint 433 by an amount is marked 436. Displacement $\Delta s$ may be adjusted by varying the amount of the optical delay that optional optical delay line 420 produces. Thus optical delay line 420 is a variable optical delay line.

Process of Chopping—FIG. 4b

FIG. 4b schematically illustrates chopping process 480 with chopper 400 of FIG. 4a. FIG. 4b illustrates part of chopper 400 of FIG. 4a, including guides 428 and 438 which are the terminals of NLE 430. FIG. 4b also shows output port 446. Discontinuity 447 represents the parts between output port 446 and guide 438 of FIG. 4a that are not shown in FIG. 4b.

The chopping process is similar to that illustrated by FIG. 1b when information pulse 102, control pulse 130, and NLE 109 of FIG. 1b are similar to information pulse 424, control pulse 464, and NLE 430, respectively. Accordingly, the operation of FIG. 4b may be understood from the description of FIG. 1b and thus its description is brief. The description of FIG. 4b is focused mainly on the relations between the location of NLE 430 on loop 451 (see chopper 400 of FIG. 4a) and the amount of chopping of pulse 424.

Information pulse 424 of signal 426 arrives from guide 428, passes through NLE 430, and is chopped by control pulse 464 of signal 442 arriving from guide 438 into NLE 430. The chopping process is performed by strong gain suppression of pulse 424 produced by high intensity control pulse 464. The chopping process starts at the time that high intensity control pulse 464 enters NLE 430 from edge 431 at line 432 and suppresses the gain of NLE 430. The intensity of remaining portion 482 of lower intensity information pulse 424 that did not yet exit NLE 430 is dramatically reduced. The reduction of the intensity of portion 482 of pulse 424 caused by the suppressed gain of NLE 430 may result in the chopping of portion 482 of pulse 424 into a substantially low intensity level.

Front edges 441 and 427 of pulses 464 and 424 meet at optical midpoint 433 on line 434 outside NLE 430. When NLE 430 is displaced by a distance $\Delta s$, marked 436, from optical midpoint 433, portion 482A of pulse 424 has already exited NLE 430. When pulse 464 arrives at edge 431 of NLE 430 on line 432, each of pulses 464 and 424 passes an additional distance $\Delta s$. This means that at the time that pulse 464 arrives to edge 431 of NLE 430, portion 482 A of pulse 424 has a spatial width W that equals to 2 $\Delta s$.

The remaining portion 482 of information pulse 424 of signal 426 is effectively chopped by the gain suppression of NLE 430 caused by the high intensity of control pulse 464 of signal 442 that is present in NLE 430 at the same time that portion 482 passes through NLE 430. Accordingly, portion 482 A of pulse 424 is the only significant part left from pulse 424, after the chopping, and it appears as chopped signal 440 that may be pulse 448 at port 446. Pulse 448 is the amplified portion 482A and may have an intensity that is higher than the intensity of pulse 424. However, the spatial width W of chopped pulse 448 is equal to the spatial width W of portion 482 and is given by:

$$W = 2 \cdot \Delta s \qquad (1)$$

Varying the delay of optional optical delay line 420 of FIG. 4a (not shown) by an amount equivalent to a spatial distance $\Delta L$ increases the length of loop 451 by an amount of $\Delta L$ and thus causes shifting of optical midpoint 433 from edge 431 of NLE 430 by an amount $\Delta L/2$. This means that a change of $\Delta L$, in the effective delay of delay line 420, causes an addition of $\Delta L/2$ in the spatial length is. Substituting the value of $\Delta s$ by $\Delta s - \Delta L/2$ in equation (1) above results in:

$$W = 2 \cdot (\Delta s - \Delta L/2) = 2 \cdot \Delta s - \Delta L \qquad (2)$$

In other words, the amount of chopping is changed by the same delay introduced by the delay of optical delay line 420.

From equation (1) above, chopper 400 of FIG. 4a chops pulses 402 received at its input terminal 406 into pulses having a fixed spatial width W. The fixed spatial width W of chopped pulses 448 that appear at output terminal 446 depends only upon the spatial displacement $\Delta s$ of NLE 430 from optical midpoint 433. Accordingly, the fixed spatial width W is not dependent on the spatial width of input pulses 402 nor on their modulation format. This means that chopper 400 of FIG. 4a is used to correct optical dispersions of stream signals modulated according to the RZ modulation format. The correction is performed by chopping the dispersed (broadened) pulses into a fixed spatial width W that is equal to the original spatial width (prior to the dispersions) of the pulses. This way the dispersed pulses are chopped back into their original width regardless of the amount of dispersion or the type of dispersions, even for dynamically changing dispersions such as PMD. Thus chopper 400 is used to correct CD, PMD, CD, and PMD simultaneously, or any other dispersion that effectively broadens the pulses of the signal stream.

Note that in the above functional descriptions for FIGS. 4a and 4b the description has been simplified by assuming negligible insertion loss of both circulator and directional coupler.

Appropriate adjustment to equations (1) and (2) should be made if the loss values become major factors to overall power evaluation.

For the same reasons as detailed in the description of chopper 400, chopper 400 also performs as a phase and polarization insensitive chopper, as well being independent of the protocol and pulse pattern of the input signal.

The operation mode of NLE 430 is affected by the electrical current injected into NLE 430. Therefore, NLE 430 may be driven into active or in-active operation states by an electric control signal that may have the form of a pulse or direct current. Therefore, the output signal will be chopped from port 406 to port 446.

Chopper 400 as shown in FIG. 4a is an exemplary configuration, and may contain a variation of the configuration of the order of the components.

The chopping by high intensity control pulse 464 may start at a location slightly different from edge 431 of NLE 430 after pulse 464 propagates into NLE 430.

Circulator 444 may be replaced by another directing device selected from a group of directing devices including couplers, directional couplers, splitters, combiners, Y-junction coupler, beam splitters, and dielectric beam splitters.

Chopper 400 as shown in FIG. 4a is one of exemplary configurations and is used as dispersion corrector to correct chromatic and polarization mode dispersions.

Chopper 400 and all the other embodiments may be constructed at least in part in a medium selected from a group of media including discrete components, on chip devices, integrated optics, planar waveguides, Planar Circuits (PLC), waveguides, radiation guides, light guides, optical fibers, free space, vacuum medium, and gaseous medium. Chopper 400 is phase and polarization insensitive.

Wavelength Converter—FIG. 5

FIG. 5 schematically illustrates another embodiment of a wavelength converter, device 500, which may also be used as an optical threshold device. The configuration of converter 500 is similar to the configuration of chopper 400 of FIG. 4a, having an additional port 554 for receiving the wavelength signal that should be converted into another wavelength signal.

Signal 504 may be a Continuous Wave (CW) signal 502. It is shown with reference to zero level signal 51 and is received by input terminal 506 that may include optional amplifier 508. Amplifier 508 is used to boost signal 504, if needed, and may include an optical isolator (not shown) to block signals that may be reflected back into input 506 from loop 551. Signal 504 may pass through amplifier 508 to emerge as signal 514 at light guide 510. Signal 514 is received by directional coupler 516 from guide 510. Coupler 516 splits signal 514 by a ratio of 1:n into signals 515 and 556 propagating in branches 518 and 552, respectively. Coupler 516 may be a symmetric coupler or an asymmetric coupler representing n=1 or n≠1 (n is any positive number, preferably n>1), respectively.

Signal 556 propagates through amplifier 558 and passes through optical circulator 560 to emerge as a high intensity amplified signal 562 at waveguide 538. Signal 562 is in the form of CW signal 564 shown with reference to zero-level signal 570. Signal 562 continuously propagates from light guide 538 as control signal 542 directed by optical circulator 544 to emerge at radiation guide 534. Control signal 542 enters NLE 529 from guide 534. When control signal 542 propagates through NLE 529, its high intensity drives NLE 529 into a saturated state (that may be even a deep saturated state) in which the gain of NLE 529 is dramatically suppressed. Signal 542 may continue from NLE 529 toward guide 510 via attenuator 522, optical delay line 520, and coupler 516. Signal 542 or part of it, reflected back to guide 510 from loop 551, is blocked by the optical isolator that amplifier 508 may include (not shown) to prevent back reflections into input terminal 506.

Signal 515 propagates from guide 518 via optional optical delay line 520, guide 521, and optional attenuator 522 to emerge as attenuated signal 530 at guide 528, which may be CW signal 524 illustrated with reference to zero level signal 526. Signal 530 has an intensity that is lower than the intensity of control signal 542. Signal 530 propagates from guide 528 and passes through NLE 529 that will amplify or suppress signal 530 in the absence or presence of control signal 542, respectively. In the absence of control signal 542, signal 530 continuously propagates from NLE 529 through guide 534, passing as signal 540 through optical circulator 544 to appear as signal 550 at port 546.

If edge 531 of NLE 529 is located on line 532, which includes optical midpoint 533 of loop 551, then the displacement $\Delta s$ of NLE 529 from midpoint 533 of loop 551, indicated by arrow 536, is equal to zero. $\Delta s$ is a displacement similar to the displacement $\Delta s$ of NLE 430 from midpoint 433 of loop 451 illustrated by FIG. 4a. In FIG. 4a the operation of chopper 400 requires $\Delta s \neq 0$ to assure that only part of information signal 402 will be chopped. However, wavelength converter 500 requires that in the absence of signal 566 there should be no output signal at output port 546. Such a requirement is achieved when $\Delta s = 0$, which means that edge 531 is located on line 532 including optical midpoint 533. There is no restriction on the modulation format of signal 566, which may be modulated signal 568 at port 554. In this case the optical distances from coupler 516 to edge 531 of NLE 529 via branches 518 and 552 are equal. Thus, the front edge of high intensity control signal meets the front edge of signal 530 at edge 533 of NLE 529 and strongly suppresses the intensity of signal 530 (even in its entirety) by gain suppression of NLE 529, resulting in almost no signal at output port 546. The location of edge 531 of NLE 529 is adjusted by varying the amount of delay produced by optional optical delay line 520. However, since signals 542 and 530 are CW beams, they are present simultaneously at NLE 529 (as long as no signal 566 is introduced into port 554) to suppress signal 530 regardless of the position of edge 531, which is different from midpoint 533.

The suppression of signal 530 by control signal 542 at NLE 529 for avoiding the appearance of output signal 550 at output port 546 requires that the intensity of signal 542 be higher than the intensity of signal 530 and that signal 542 be strong enough to drive NLE 529 into a saturated state. This requirement is achieved by any combination of optional amplifier 508 gain, coupler 516 splitting ratio, and optional attenuation in attenuator 522, i.e., the use of all of them, part of them, or one of them.

Influence of Control Signal—FIG. 5

In the absence of modulated information signal 568 at port 554, CW control signal 542 blocks CW signal 530 at NLE 529 and prevents the appearance of CW signal 530 at output port 546. Refer to the situation in which no signal is produced at output port 546 in the absence of signal 568 at port 554 as a "balanced" state of wavelength converter 500.

Information signal 568 is introduced to information port 554 and is amplified there by optional amplifier 555, which may be included in port 554. Signal 568 is directed by optical circulator 560 from port 554, towards amplifier 558. Signal 568 is strong enough to suppress the gain of amplifier 558 to reduce or block the intensity of signal 556 arriving at NLE 529 from guide 538 via circulator 544 as control signal 542. In this case, the absence or the lower intensity of control signal 542 does not produce gain suppression or is not sufficient for producing a strong gain suppression of the gain at NLE 529, resulting in complete or partial transmission of signal 530 to output port 546 of converter 500 in which signal 530 appears as signal 550. The duration time of such "transmission" state (mode) is equal to the duration which signal 568 is present at port 554. Optical amplifier 558 may be replaced by any type of NLE to perform similar functions.

Accordingly when modulated information signal 568 includes a pulse, the presence of such a pulse at port 554 drives wavelength converter 500 into transmission mode to produce a pulse 548 at port 546, which has the same width as the pulse of signal 568 introduced to port 554. However, when modulated information signal 568 includes a "zero" level signal (i.e. no signal), then the absence of such a pulse at port 554 keeps wavelength converter 500 in a "balanced" state in which no signal (zero signal) 550 (or 548) is produced at port 546. The "zero" duration of signal 548 is equal to the zero duration of information signal 568 introduced to port 554.

Thus, it is clear that pulse pattern 568 of information signal 566 is copied by device 500 onto CW signal 530 to produce pulse pattern 548 of signal 550 at port 546, which is the same or similar to pulse pattern 568. Pulse patterns 568 and 548 at ports 554 and 546, respectively, carry the same information, and have similar structures and periodicities. However, pulse patterns 568 and 548 may have different amplitudes due to the different gains they experience in device 500.

If CW beam 502 has wavelength $\lambda_1$, and information signal 566 (pulse pattern 568) has wavelength $\lambda_2$, then signal 530 has the same wavelength $\lambda_1$ as CW beam 502. This wavelength is different from wavelength $\lambda_2$ of information signal 566. In this case, device 500 copies pulse pattern 568 of information signal 566, having wavelength $\lambda_2$ at port 554 onto CW signal 530 having wavelength $\lambda_1$ which then appears as pulse pattern 548 of signal 550 at output port 546. Signal 550 has wavelength $\lambda_1$ and a pulse pattern that is the same or similar to pulse pattern 568. This means that device 500 operates as a wavelength converter.

Operation of Device as Regenerator—FIG. 5

If $\lambda_1$ and $\lambda_2$ have the same wavelength ($\lambda_1=\lambda_2$), device 500 may operate as a regenerator for regenerating information signal 566 as a new signal 550 having the same wavelength and information pattern at port 546.

The wavelength of signal 550 at port 546 does not depend upon the type of wavelengths used for information signals 566 at port 554.

As explained above, in the absence of signal 566 at port 554, device 500 is in a "balanced" state and does not produce output signal 550 at port 546. Device 500 is maintained in a "balanced" state even for signals 566, which have an intensity level below the intensity level required to drive amplifier 558 into a saturated state. There is a first range of intensities of information signal 566 in which amplifier 558 is capable of simultaneously amplifying signals 566 and 556 without being saturated or reducing the intensity of signal 556 that later appears as control signal 542 at guide 534. For this range of intensities, control signal 542 is strong enough to block signal 530 at NLE 529 and thus device 500 is maintained in a "balanced" state and does not produce output signal 550 at output port 546.

In a second range of intensities, information signal 566 includes intensities that are higher than the intensities of the first range but are not strong enough to drive amplifier 558 into deep saturation. In this case amplifier 558 starts to operate in the beginning of its saturation range. Thus the amplification of signal 556 is reduced and leads to intensity reduction of control signal 542 at guide 534. As a result guide 534 does not completely block signal 530 at NLE 529, resulting in an "imbalanced" state for device 500, which starts to produce signal 550 at port 546. In the "imbalanced" state a weak (small amplitude) signal 550 exists at port 546.

In a third range of intensities, information signal 566 includes intensities that are higher than the intensities of the second range and are strong enough to drive amplifier 558 into deep saturation. Thus amplifier 558 operates deep in its saturation range. Thus the amplification of signal 558 is significantly reduced, resulting in a high intensity control signal 542 at guide 534, so that guide 534 blocks the entire or most of the intensity of signal 530 at NLE 529 and produces a strong "imbalanced" state of device 500 that produces a strong (large amplitude) signal 550 at port 546.

Accordingly, for intensities which are at least in the first range and are below the intensities of the second and third ranges, a very small or almost no signal 550 is produced at output port 546 of device 500. Thus, device 500 may not produce or may produce very small signals at its output 546 in response to input information signals 566 at input port 554 of device 500. This occurs as long as input signals 566 have intensities that are below a threshold intensity level defined as the intensity in which the second range of intensities starts.

Operation as Threshold Device—FIG. 5

As discussed below, device 500 can be operated as a threshold device, and shall be referred to as a threshold device 500, as well. The threshold level of device 500 is varied by adjusting the parameters that determine the conditions in which NLEs 558 and 529 are driven into a saturated state by information signals 566 and control signal 533, respectively. Information signal 566 may be a pulse pattern 568 or a CW beam. When NLE 558 is saturated, its gain is suppressed and it produces a low intensity control signal 533 that cannot suppress the gain of NLE 529, allowing signal 550 to emerge at port 546. In this case threshold device 500 is adjusted to have a threshold level that is lower than the intensity of information signal 566. When NLE 558 is not saturated it produces a high intensity control signal 533 that suppresses the gain of NLE 529, and no signal 550 appears at port 546. In this situation threshold device 500 is adjusted to have a threshold level that is higher than the intensity of information signal 566.

The parameters that determine the conditions in which NLEs 558 and 529 are driven into a saturated state by information signal 566 and control signal 533, respectively, thus controlling the threshold level of device 500) are as follows:

The electric currents injected to NLEs 558 and 529 adjust their excitation levels and gains. The excitation levels and the gains of NLEs 558 and 529 are adjusted to be equal or different.

The intensities of information signal 566 at NLE 558 and control signal 533 at NLE 529, which are determined, among others, by the amplification of optional optical amplifier 555 at port 554.

Signal 556 at NLE 558 is determined, among other things, by the amplification of optional optical amplifier 508 at port 506 and the splitting ratio of splitter 516, which may be a symmetric or asymmetric splitter.

Signal 530 at NLE 529 is determined, among other things, by the amplification of optional optical amplifier 508 at port 506, the attenuation of optional attenuator 522, and the splitting ratio of splitter 516.

Device 500 may include an additional port 574 to couple, by coupler 572, reference signal 576 into port 554. The intensity of reference signal 576 determines, among other things, the intensity of information signal 566 for which NLE 558 is driven into a saturated state and thus controls the threshold level of threshold device 500.

Reference signal 576 at port 574 and signal 504 at port 506 are both able to control or adjust the threshold level of threshold device 500. Each of signals 576 and 504 may serve as an external reference signal to jointly allow operation of threshold device 500 as an optical comparator.

This means that device 500 can operate as a wavelength converter, a threshold device, or an optical comparator. The threshold mechanism of device 500 is an integral part of the operation principle of device 500 thus device 500 may be operated as a stand alone optical threshold device or as another device, such as listed below, which includes the threshold mechanism as well.

Accordingly, device 500 is used to perform various functions: i.e., a stand-alone optical threshold device whose threshold level is adjusted and controlled, an optical comparator that may include a variable external threshold reference, a stand-alone wavelength converter, a stand-alone regenerator, a wavelength converter integrated with a threshold mechanism, and a regenerator integrated with a threshold mechanism.

The threshold mechanism of device 500 allows it to discriminate low amplitude noise signals to separate the information signal from the noise for improving Signal-to-Noise-Ratio (SNR). Unlike wavelength filters, such a threshold mechanism allows the removal of noise having the same wavelength as the information signal.

NLE 529 may also be of any type of optical amplifier and that amplifier 558 may be of any type of NLE. Attenuator 522 may be an optical amplifier operating in a range of amplification smaller than 1 (one) which is an absorption mode of operation. Device 500 may be constructed in different types of media and is phase and polarization insensitive. Circulators 560 and 544 may be replaced by any type of directing devices, such as couplers.

Additional Wavelength Converter—FIG. 6

An alternative design for a wavelength converter is illustrated by embodiment 600 of FIG. 6. As is explained below, device 600 may also be used as an optical threshold device. A CW beam 602 is injected at input port 610 of wavelength converter as signal 608, having intensity level 604 shown with reference to zero level 606. Signal 608 propagates through NLE 612 and emerges at radiation guide 614. Information port 678 may include optical amplifier 677 to boost the intensity of information signal 676 received at port 678. Information signal 676 is schematically illustrated as signal 670, which has pulses 672 and 674. Signal 676 may pass through optional amplifier 677 and is directed by optical circulator 636, as control signal 618, into guide 614, towards NLE 612.

In the absence of control signal 618 corresponding to information signal 676, signal 608 may pass, as signal 616, through circulator 636 to appear as signal 621 propagating in light guide 638. Control signal 618 has an intensity that is greater than the intensity of signal 608 and is strong enough to dramatically suppress the gain of NLE 612 by driving NLE 612 into a saturated state that may even be a deep saturated state. NLE 612 may include an optical isolator (not shown) for blocking control signal 618 from being propagating back toward input 610. At the time that control signal 618 propagates in NLE 612 together with signal 608, the gain suppression that signal 618 produces in NLE 612 significantly decreases the intensity of signal 608 in a way that very little intensity or almost no signal 608 exits NLE 612 into guide 614. This results in zero or very little signal 621 at port 638.

Accordingly, CW signal 608 appears with its highest intensity as signal 621 at port 638 as long as signal 676 is absent from information port 678. Signal 676 may include information pulses such as exemplary pulses 672 and 674. During the time in which signal 676 is present at port 678, signal 621 is reduced to zero (or very small intensity) whenever information pulses, such as pulses 672 and 674, are high. Thus, for the time periods in which information signal 676 has logical ZEROS and ONES, signal 621 has maxima and minima, respectively. Fore example, a logic state ONE of signal 676 at port 678 is illustrated by pulses 672 and 674 of pattern 670. These correspond to minima 622 and 624 of signal 621 at port 638. This means that port 638 may produce output signal 621 at point 639, which is the inverted signal of information signal 676. In other words, the combination of NLE 612 with circulator 636 apply the logic NOT function on signal 676 received at port 678 to produce inverted signal 621 at port 638.

Signal 626 propagating at input port 634 of wavelength converter 600 is a CW beam 628 having intensity level 630 shown with reference to zero level 632. Signal 626 propagates from port 634 through NLE 652 and emerges at radiation guide 654. Port 648 receives signal 621 from port 638 as signal 644 at connection point 639. Signal 644 is the inversion of information signal 676 schematically illustrated as signal 646 having exemplary minima 640 and 642 corresponding to exemplary pulses 672 and 674 of signal 676 (670). Signal 644 passes as control signal 650 through optical circulator 658 into guide 654, towards NLE 652.

In the absence of control signal 650, corresponding to signal 644, signal 626 may pass as signal 656 through circulator 658 to appear as signal 668 propagating in light guide 660, which is the output port of wavelength converter 600. Control signal 650, previously amplified by NLE 612 as signal 608, has an intensity that is higher than the intensity of signal 626 and is strong enough to dramatically suppress the gain of NLE 652 by driving NLE 652 into a saturated state that may even be a deep saturated state. NLE 652 may include an optical isolator (not shown) for blocking control signal 650 from propagating back toward input 634. At the time that control signal 650 propagates in NLE 652 together with signal 626, the gain suppression that signal 650 produces at NLE 652 significantly decreases the intensity of signal 626 in a way that very little intensity or almost no signal 626 exits from NLE 652 into guide 654. This results in zero or very little signal 668 at port 660.

Accordingly, CW signal 626 appears with its highest intensity as signal 668 at port 660 as long as signal 644 is absent from port 648. For the time in which signal 644 has its maximum intensity level 641 of pattern 646 of signal 644, control signal 650, corresponding to signal 644, has an intensity that is high enough to dramatically suppress the gain of NLE 652 for blocking most of the intensity of signal 626 and producing very small or no signal 668 at output port 660. During the time in which signal 644 may include a pattern such as exemplary minima 640 and 642 and is not present at port 648, output signal 668 has its highest intensity in the form of pulses 664 and 666 of pattern 662. Signal 668 lasts for the duration in which minima, such as, minima 640 and 642, are present at port 648. Thus, for the time periods in which signal 644 has logical ZEROS and ONES, signal 668 has maxima and minima, respectively. For example and as explained above, ZERO logic states of signal 644 at port 648, illustrated by ZEROS 640 and 642 of pattern 646, correspond to maxima 664 and 666 of pulse pattern 662 of signal 668 at port 660. This means that port 660 may produce output signal 668, which is the inverted signal of signal 644 at port 648. In other words, the combination of NLE 652 with circulator 650 apply the logic NOT function on signal 644 (621) received at port 648 to produce inverted signal 668 at port 660.

Signal 621 is the inverted signal of information signal 676 at port 678 and signal 668 is the inverted signal of signal 621. This means that signal 668 is similar to signal 676, which has the same information pattern but may have different amplitudes due to different gains that signals 668 and 676 experience in device 600.

Device as Cascade of Logic Gates—FIG. 6

The same conclusion is realized by noting that device 600 is constructed from two logical NOT gates connected in series. The first NOT gate includes NLE 612 and circulator 636 and is connected at point 639 to the second NOT gate including NLE 652 and circulator 658. This means that applying a logic NOT twice in a row provides, at port 660, an information pattern 662 of output signal 668, which is the same or similar to original information pattern 670 of signal 676 at information port 678.

Thus, pulse pattern 670 of information signal 676 is copied by device 600 onto CW signal 626 to produce pulse pattern 662 of signal 668 at port 660, which is the same or similar to pulse pattern 670. Pulse patterns 670 and 662 at ports 678 and 660, respectively, carry the same information, have similar structures and periodicities. However, pulse patterns 670 and 662 may have different amplitudes due to different gains that they experience. If CW beam 628 (630) at signal 626 has wavelength $\lambda_1$, and information signal 676 has wavelength $\lambda_2$, then signals 656 and 668 have the same wavelength $\lambda_1$ of CW beam 630 that may or may not be different from wavelength $\lambda_2$ of information signal 676. In this case, device 600 copies pulse pattern 670 of information signal 676, having wavelength $\lambda_2$ at port 678 onto CW signal 634 having wavelength $\lambda_1$ which then appears as pulse pattern 662 of signal 668 at output port 660 having wavelength $\lambda_1$ and a pulse pattern that is the same or similar to pulse pattern 670. This means that device 600 operates as a wavelength converter.

If $\lambda_1$ and $\lambda_2$ have the same wavelength, device 600 may operate as a regenerator for regenerating information signal 676 as new signal 668 having the same wavelength and information pattern at port 660.

The wavelength type of signal 668 at port 660 does not depend upon the wavelength types used for signals 608 and 676 at ports 610 and 678, respectively.

As explained above, in the absence of signal 676 at port 678, device 600 is in a "balanced" state in which it does not produce output signal 668 at port 660. Device 600 is maintained in a "balanced" state, even for signals 676 whose intensity level is below the intensity level required to drive amplifier (NLE) 612 into a saturated state. There is a first range of intensities of information signal 676 in which amplifier 612 is capable of simultaneously amplifying signals 676 and 608 without being saturated or reducing the from appearing at port 660 as signal 668. In this case, device 600 is maintained in a "balanced" state and does not produce output signal 668 at output port 660.

A second range of intensities of information signal 676 includes intensities that are higher than the intensities of the first range but are not strong enough to drive amplifier 612 into deep saturation. In this case, amplifier 612 starts to operate at the beginning of its saturation range. Thus the amplification of signal 608 is reduced, resulting in control signal 650 having an intensity lower than its maximum intensity, which leads to an "imbalanced" state. In this "imbalanced" state, device 600 starts to produce a small amplitude signal 668 at port 660.

A third range of intensities of information signal 676 includes intensities that are higher than the intensities of the second range and are strong enough to drive amplifier 612 into deep saturation. Here amplifier 612 operates deep in its saturation range and thus the amplification of signal 676 is significantly reduced, resulting in no or low intensity control signal 650 which leads to a "strong imbalanced" state. In this state device 600 produces a large amplitude signal 668 at port 660.

Accordingly, for intensities which are at least in the first range and are below the intensities of the second and third ranges, no signal 668 is produced at output port 660 of device 600. Accordingly, device 600 does not produce signals at its output 660 in response to input information signals 676 at input port 678 of device 600 as long as input signals 676 have intensities that are below a threshold intensity level, defined as the intensity in which the second range of intensities starts.

This means that device 600 operates as a threshold device as well. The threshold level of device 600 is varied by adjusting the parameters that determine the conditions in which NLEs 612 and 652 are driven into a saturated state by information signal 676 and control signal 650, respectively. Information signal 676 may be pulse pattern 672 or a CW beam. When NLE 612 is saturated its gain is suppressed and it produces low-intensity control signal 650 that cannot suppress the gain of NLE 652, resulting in signal 668 at port 660. In this case threshold device 600 is adjusted to have a threshold level that is lower than the intensity of information signal 676 at port 678. When NLE 612 is not saturated it produces a high intensity control signal 650 that suppresses the gain of NLE 652, resulting in no signal 668 at port 660. In this case threshold device 600 is adjusted to have a threshold level that is higher than the intensity of information signal 676.

The parameters that determine the conditions in which NLEs 612 and 652 are driven into a saturated state by information signal 676 and control signal 650, respectively, and thus control the threshold level of device 600 are:

Electric currents are injected to NLEs 612 and 652 to adjust their excitation levels and gains. The excitation levels and the gains of NLEs 612 and 652 are adjusted to be equal or different.

The intensities of information signal 676 at NLE 612 (signal 618) and control signal 650 at NLE 652, are determined, among other things, by the amplification of optional optical amplifier 677 at port 678 and the amplification of NLE 612, respectively.

Device 600 may include additional port 684 to couple, by coupler 682, reference signal 686 into port 678. The intensity of reference signal 686 determines, among other things, the intensity of information signal 676 for which NLE 612 is driven into a saturated state and thus controls the threshold level of threshold device 600.

Reference signal 686 at port 684, signal 626 at port 634, and signal 608 at port 610 are all able to control or adjust the threshold level of threshold device 600. Each of signals 686, 626, and 608 may serve as an external reference signal to operate threshold device 600 as an optical comparator.

The threshold mechanism of device 600 is an integrated part of the operation principle of device 600. Thus device 600 may be operated as a stand-alone optical threshold device, an optical comparator, or as other devices, such as listed below, which include the threshold mechanism as well.

Accordingly, device 600 is used to perform several functions. I.e., it may be operated as a stand-alone optical threshold device whose threshold level is adjusted or controlled, as an optical comparator that may include a variable external threshold reference, as a stand-alone wavelength converter, as a stand-alone regenerator, as a wavelength converter integrated with a threshold mechanism, and as a regenerator integrated with a threshold mechanism.

The threshold mechanism of device 600 allows it to discriminate low amplitude noise signals to separate the information signal from the noise for improving Signal-to-Noise-Ratio (SNR). Unlike wavelength filters, such a threshold mechanism allows it to remove noise having the same wavelength as the information signal.

NLEs 612 and 652 may also be of any type of optical amplifiers and amplifier 677 may be of any type of NLE. Device 600 may be constructed in different types of media and is phase and polarization insensitive. Circulators 636 and 658 may be replaced by any type of directing devices such as various types of couplers.

Dispersion Corrector for Pulses Modulated By RZ and NRZ Formats—FIG. 7

An alternative design for an optical chopper is illustrated by embodiment 700 of FIG. 7a. Input information signal 704, which may be a pulse 702, propagates at input port 706 and is amplified by optional optical amplifier 708 to emerge at light guide 710. Optional amplifier 708 is used to boost the intensity of signal 704 whenever needed to ensure that control signals 776 and 766, corresponding to input signal 704, will be able to drive NLEs 746 and 734 into saturation states. Signal 704 continuously propagates from guide 710 into splitting mechanism 714, which may include splitter 712. Splitter 712 may be a star splitter or a cascade of splitters or couplers.

Splitter 712 receives pulse 702 of information signal 704 from guide 710 and splits it into signals 733, 744, and 724, i.e., into pulses 732, 742, and 722 propagating in light guides 716, 720, and 721, respectively. These light guides are the output terminals of splitter 712. Terminals 716 and 720 of splitter 712 are associated with optical loop 751 A. Terminals 720 and 721 of splitter 712 are associated with optical loop 751.

Each of loops 751 and 751A operates as an optical chopper in a manner similar to optical loop 451 of chopper 400 of FIG. 4a. Thus some of the descriptions and explanations of FIGS. 4a and 4b will not be repeated or will only be described briefly here.

Signal 724 propagating from guide 721 is amplified by optional amplifier 754 to emerge as control signal 776 propagating from light guide 782 via circulator 778 into optical guide 772 toward NLE 746. Signal 744 propagating from guide 720 passes through optional optical delay line 718 into guide 719. Signal 744 passes from guide 719 via optional attenuator 726 to appear as attenuated signal 744 in guide 728 propagating toward NLE 746.

While pulse 742 of signal 744 passes through NLE 746, a portion of it is suppressed and chopped by the gain saturation of NLE 746 introduced at part of the transmission time of signal 744 at NLE 746 by high intensity control signal 776. The amount of chopping of pulse 742 depends upon the arrival time of signals 744 and 776 to NLE 746 and by distance Δs marked by numeral 752 (FIG. 7a) in which edge 748 of NLE 746 is displaced from optical midpoint 750. Optical midpoint 750 is the point from which two optical signals would take equal times to propagate from splitter 712 through guides 720 and 721.

Sequence of Tail Chopping—FIG. 7b

FIG. 7b is a schematic illustration 800 showing the positions of pulses 742 and 722 of signals 744 and 776 of chopper 700 propagating in guides 728 and 772, respectively, with respect to NLE 746. Edge 748 is displaced by distance Δs, marked 752, from optical midpoint 750. Discontinuity 771 represents the components between guides 772 and 770 of chopper 700, illustrated in FIG. 7a and not shown in FIG. 7b. Hatched portion 802 of pulse 742 is chopped by gain suppression of NLE 746 that starts when control pulse 722 enters NLE 746 via edge 748 and drives NLE 746 into saturation, which may be deep saturation.

The other portion 803 of pulse 742 that is not suppressed passes as chopped signal 774 (see FIG. 7a) through circulator 778 (see FIG. 7a) and appears as chopped pulse 768 of signal 780 at guide 770.

FIG. 7b is similar to FIG. 4b. Pulses 722, 742, and 768, guides 728, 772, and 770, NLE 746, edge 748, point 750, distance Δs, and discontinuity 771 of FIG. 7b correspond to respective pulses 464, 424, and 448, guides 428, 438, and 446, NLE 430, edge 431, point 433, distance Δs and discontinuity 447 of FIG. 4b. Accordingly, the chopping of pulse 424 at NLE 430 to produce chopped pulse 448 at port 446 (explained for chopper 400 of FIGS. 4a and 4b) stands for the chopping process of pulse 742 to produce chopped pulse 768 at guide 770 of chopper 700 of FIGS. 7a and 7b as well. Thus it is clear that equation (1) that gives the mathematical expression for width W of chopped pulse 448 of FIGS. 4a and 4b stands also for the width W of pulse 768 of FIGS. 7a and 7b. This shows that the width of chopped pulse 768 is fixed, determined only by the distance Δs and is independent on the width of pulse 742 that is chopped. Distance Δs is adjusted to control the amount of chopping of pulse 742 and the width W of pulse 768 at guide 770 of chopper 700. This adjustment is controlled by varying the delay of optical delay line 718 (FIG. 7a) as expressed by equation (2). While equation (2) describes the contribution of the spatial delay ΔL of optical delay line 520 of chopper 400 of FIG. 4a, it is also useful to describe the contribution of the spatial delay ΔL of optical delay line 718 of chopper 700 of FIG. 7a.

Refer back to FIG. 7a, it shows chopped pulse 768 having a spatial width W, equal to 2Δs, propagating in guide 770 as control signal 780 for optical loop 751A. Signal 780, previously amplified by NLE 746 as signal 744, propagates from guide 770 as high intensity control signal 766, passing through circulator 764 and into guide 739 in which it continuously propagates toward NLE 734. At the same time, signal 733, which may be pulse 732, may propagate from terminal 716 of splitter 712 via optional optical delay line 729 to appear at radiation guide 721. Signal 733 may continue to propagate from guide 721 via optional attenuator 730 to appear as attenuated signal 733 propagating in radiation guide 735 toward NLE 734.

For proper operation of chopper 700, the intensity of control signal 724 should be higher than the intensity of signal 744 and should be strong enough to drive NLE 746 into a saturated state. Similarly, the intensity of control signal 780 should be higher than the intensity of signal 733 and should be strong enough to drive NLE 734 into a saturated state. Since pulse 768 of signal 780 is an amplified (and chopped) signal 744, it means that the high intensity of signal 780 is maintained even when signal 744 has relatively low intensity, i.e., similar to the intensity of signal 733 and lower than the intensity of control signal 724. All these requirements are achieved while still satisfying the requirement for high intensity control signal 780 that can drive NLE 734 into a saturated state.

Maintaining high intensity for control signal 724, which is higher than signals 733 and 744 at NLEs 734 and 746, respectively, is achieved by optimization of components, including boosting amplifier 708 to increase the intensity of input signal 704 so that a fraction of it serves as control signal 724. Amplifier 754 is used to amplify control signal 724 and attenuator 726 attenuates signal 744 to assure that its intensity is lower than the intensity of control signal 724. Attenuator 730 attenuates signal 733 to assure that its intensity is lower than the intensity of control signal 766; and splitter 712 is used as an asymmetric splitter to provide intensity to control port 721. This assures that the intensity of control signal 766 is higher than the intensities that splitter 712 provides to ports 720 and 716.

All the above optional components, or some of them, or only one of them may be may be used in device 700.

While pulse 732 of signal 733 passes through NLE 734, a portion of it is suppressed and chopped by the gain saturation of NLE 734 introduced at part of the transmission time of signal 733 at NLE 734 by high intensity control signal 766. The amount of chopping of pulse 732 depends upon the width W of control signal 766 and the arrival times of signals 733 and 766 to NLE 734. The amount of chopping of pulse 732 is also determined, as explained above for chopper 400 in FIGS. 4a and 4b, by the distance $\Delta s_1$ marked 740, in which edge 736 of NLE 734 is displaced from optical midpoint 738. Optical midpoint 738 is the point from which the optical paths to splitter 712 through guides 716 and 720 are equal. Chopped pulse 732 of signal 733 exists NLE 734 into guide 739. From there it is directed by optical circulator 764 as signal 760 into output port 762 of chopper 700 to appear there as pulse 756 of signal 758.

Sequence of Head Chopping—FIG. 7c

FIG. 7c is a schematic illustration 850 showing the positions of pulses 732 and 768 of signals 733 and 766 of chopper 700 of FIG. 7a, propagating in guides 735 and 739 with respect to NLE 734. Its edge 736 is displaced by distance $\Delta s_1$, marked 740, from optical midpoint 738. Discontinuity 871 represents the components between guides 739 and 762 of chopper 700, illustrated in FIG. 7a, which are not shown in FIG. 7c. Hatched portion 876 of pulse 732 is chopped by gain suppression of NLE 734 that starts when control pulse 768 enters NLE 734 via edge 736 and drives NLE 734 into saturation, which may be deep saturation. The other, non-hatched, portion 879 of pulse 732 that is not suppressed passes as chopped signal 760 through circulator 764 (FIG. 7a) and appears as chopped pulse 756 of signal 758 at port 762.

FIG. 7c is similar to FIG. 4b. Pulses 768, 732, and 756, guides 735, 73,9 and 762, NLE 734, edge 736, point 738, distance $\Delta s_1$, and discontinuity 781 of FIG. 7c correspond to pulses 464, 424, and 448, guides 428, 438 and 446, NLE 430, edge 431, point 433, distance Δs, and discontinuity 447 of FIG. 4b. Accordingly, the principle of the chopping of pulse 424 at NLE 430 to produce chopped pulse 448 at port 446 (explained for chopper 400 of FIGS. 4a and 4b) applies to the chopping of pulse 732 to produce chopped pulse 756 at port 762 of chopper 700 of FIGS. 7a and 7c.

However there are slight differences between the chopping provided by NLE 734 of FIGS. 7a and 7c and the chopping of NLE 430 of FIGS. 4a and 4b and NLE 746 of FIGS. 7a and 7b. In NLE 430 and NLE 746 the chopping is performed by control pulses 442 and 776, which have the same width W as information pulses 424 and 742 that they chop and are split, respectively. In NLE 734 control pulse 768 is chopped at NLE 746 and thus is narrower than information pulse 732 that it chops. In addition, chopping 850 schematically illustrated in FIG. 7c is preformed for $\Delta s_1 = 0$ while in FIGS. 4b and 7a, the chopping is performed for $\Delta s \neq 0$. The chopping for $\Delta s_1 = 0$ is preformed in device 500 of FIG. 5 to achieve zero signal 550 at output port 546 when device 500 is in a "balanced" state. Still, the chopping process performed in device 500 for the balanced state is conducted with information and control pulses 530 and 533, respectively. These have the same width W, while the chopping of device 700 of FIG. 7a at NLE 734 in performed with control pulse 766 that is narrower than information pulse 733.

Front edges 872 and 874 of pulses 768 and 732, respectively, meet at edge 736 of NLE 734. Control signal 768 chops information signal 732 by suppressing the gain of NLE 734. The time that the chopping lasts is equal to the time that pulses 768 and 732 are both present at NLE 734. When the length of NLE 734 is not compared to the spatial length (width) of pulses 732 and 768, the chopping time is equal to the propagation time that takes pulse 768 to propagate a distance that is equal to its spatial width $W_1$. At that same time, pulse 732 propagates in NLE 734 the same distance (equal to $W_1$) which is illustrated by hatched region 876. Thus, hatched region 876 is the portion of pulse 732 that is chopped by control pulse 768; both of them have the same spatial width $W_1$. Remaining portion 879 (marked as non-hatched region) of pulse 732 appears as chopped pulse 756 at port 762 and its spatial width is given by:

$$W_2 = W - W_1 \quad (3)$$

where $W_2$ is the spatial width of chopped pulse 756 at port 762, and W is the spatial width of pulse 702 of information signal 704 at input port 706 of chopper 700 of FIG. 7a. W is also the spatial width of all the pulses that are split from information pulse 702 which are other information pulses 732, 742, and control pulse 722 of FIG. 7a. $W_1$ is the spatial width of control pulse 768 at guide 770 or control signal 766 at guide 739 of FIG. 7a. Signal 766 is actually pulse 742, chopped and amplified by NLE 746.

When the length of NLE 734 is not ignored with comparison to the spatial length (width) of pulses 732 and 768 and is equal to $\Delta x$, the chopping time is equal to the time that pulses 768 and 732 are both present at NLE 734. This time equals to the time it takes pulse 768 to propagate a distance that is equal to its spatial width $W_1$ with additional distance $\Delta x$. At the same time pulse 732 propagates in NLE 734 the same distance (equal to $W_1 + \Delta x$) which is illustrated by hatched region 876. Hatched region 876 is the portion of pulse 732 that is chopped by control pulse 768; both of them have the same width $W_1 + \Delta x$. The remaining portion 879 of pulse 732 appears as chopped pulse 756 at port 762 and its width is given by:

$$W_2 = W - (W_1 + \Delta x) \quad (4)$$

where $\Delta x$ is the length of NLE 736 and $W_2$, $W$ and $W_1$ are the same parameters defined above for equation (3).

Chopping process 850, schematically illustrated by FIG. 7c, shows a process of head chopping performed by chopper 700 of FIG. 7a. Process 850 may perform tail chopping as well as illustrated by FIG. 7d.

Sequence of Tail Chopping—FIG. 7d

FIG. 7d schematically illustrates tail chopping of information pulse 732 by gain suppression of NLE 734 introduced by control pulse 768. FIGS. 7c and 7d illustrate the same guides, ports, and pulses. However, the relative positions of pulses 732 and 768 of signals 733 and 766 propagating in guides 735 and 739, respectively, with respect to NLE 734 are different in FIGS. 7c and 7d. The relative position of pulses 732 and 768 is adjusted by varying the delay of optical delay line 729 of FIG. 7a. The influence of a spatial delay $\Delta L$ produced by optical delay line 729 on parameter $\Delta s_1$ of FIG. 7a is expressed by equation (2) given for the corresponding parameter $\Delta s$ of FIG. 4.

The displacement $\Delta s_1$ of edge 736 of NLE 734 from optical midpoint 738 should be adjusted to a proper value to avoid chopping pulse 732 into two pulses. This means that the presence of control pulse 768 at NLE 734 should last at least the same time (or more) than the time needed for hatched chopped portion 877 of pulse 732 to exit from NLE 734. Since the chopping amount produced by control pulse 768 is given by equation (4) and is equal to $(W_1 + \Delta x)$, then the size of chopped portion 877 should be equal to or less than $(W_1 + \Delta x)$. Accordingly, portion 878 of pulse 732 that already exited NLE 734 should be equal to spatial width $W$ of pulse 732, less the amount that should be chopped and is equal to:

$$W_{878} = W - (W_1 + \Delta x) \quad (5)$$

Accordingly, front edge 872 of control pulse 768 should reach edge 736 of NLE 734 at the time that the width of portion 878 of pulse 732 has a value $W_{878}$ that is greater than or equal to the value expressed by equation (5) above. For creating a certain width $W_{878}$ for portion 878 of pulse 732, the displacement $\Delta s_1$ marked 740 (FIG. 7a) should be half of this value. Thus the displacement of edge 736 of NLE 734 from optical midpoint 738 is given by:

$$\Delta s_1 = \frac{W_{878}}{2} \geq \frac{W - (W_1 + \Delta x)}{2} \quad (6)$$

The spatial width $W_1$ of control pulse 768 is the width produced by chopping pulse 742 by NLE 746 of FIG. 7a as expressed by equation (1) to be $2\Delta s$. Substituting the value of $W_1$ in equation (6) above gives:

$$\Delta s_1 = \frac{W_{878}}{2} \geq \frac{W - (2\Delta s + \Delta x)}{2} \quad (7)$$

For many practical uses, $\Delta x$ may be ignored and then:

$$\Delta s_1 = \frac{W_{878}}{2} \geq \frac{W - 2\Delta s}{2} \quad (8)$$

$W_{878}$ is equal to the spatial width of chopped pulse 756 at port 762 of chopper 700 of FIG. 7a. From equation (7) above we get:

$$W_2 = W - 2 \cdot \Delta s - \Delta x \quad (9)$$

Thus, optical delay line 729 is adjusted to perform head or tail chopping at NLE 734 by the amount that is equal to spatial width $W_1$ of control pulse 768 regardless the spatial width $W$ of information signal 704 at input 706 of chopper 700 of FIG. 7a. As explained above, the spatial width $W_1 = 2\Delta s$ of control pulse 768 does not depend upon width $W$ of information signal 704 at input 706 of chopper 700 of FIG. 7a. Thus chopper 700 produces a fixed amount of head or tail chopping regardless the spatial width of the information signal received at its input 706.

Accordingly, pulse 756 of signal 758 at port 762 has a spatial width $W_2$ that is equal to the width $W$ of information signal 704 that chopper 700 receives at input port 706, less a fixed amount of chopping $W_1 = 2\Delta s$ that is independent of the width $W$ of input information signal 704. The fixed amount of chopping is adjusted by the delays of optical delay lines 729 and 718 of chopper 700 of FIG. 7a.

The ability of chopper 700 to chop signals 704 by a fixed amount that is independent of the width of information signals 704, received at its input, enables device 700 to correct optical dispersions of pulses modulated according to the NRZ format. The broadening caused by optical dispersions for a single pulse representing a logic ONE, or by a series of successive pulses representing multiple states of logic ONEs in a row, is the same.

Thus information pulses 702 of signal 704 modulated according to the NRZ modulation format that were broadened by optical dispersions can be corrected with chopper 700. The correction is performed by chopping pulses 702 by a fixed amount that is equal to the amount of dispersion broadening. In this way, dispersion broadened pulses 702 are chopped back into their original widths in the form of chopped pulses 756 at port 762 of chopper 700 of FIG. 7a.

Bistable Device—FIG. 8

FIG. 8 is a schematic illustration of a phase- and polarization-insensitive bistable device 900. Like all other embodiments, the operational principle of device 900 is based on gain suppression, which depends upon the intensity of the signals and does not depend upon the phase and polarization of the signals.

CW signal 906 has an intensity level 902, illustrated with respect to zero baseline level 904. It is received by terminal 910 of bistable device 900. CW beam 906 continuously propagates in terminal 910 and is there amplified by optional optical amplifier 908, to emerge at light guide 912. CW beam 906 is received by splitter 914 from guide 912 to be split into CW beams 918 and 944 propagating in branches 916 and 942, respectively.

CW beam 918, arriving from guide 916, passes through NLE 920 to appear as amplified or suppressed beam 918 at radiation guide 922. The amplification or suppression of CW beam 918 at NLE 920 depends upon the intensity of signal 968 that NLE 920 receives in a direction that is counter-propagating to signal 918. Amplified or suppressed CW beam 918 passes trough guide 922, via coupler 924, into waveguide 926, where it propagates as CW signal 928. Splitter 930 receives a CW signal 928 from guide 926 and splits it into CW signals 932 and 962 which propagate in radiation guides 934 and 974, respectively. CW signal 962 is amplified by optional amplifier 972 to appear at light guide 970 from which it is further coupled by combiner 956 (or a splitter for the counter-clockwise propagating signals, as explained below) into guide 952 as CW signal 964. Optional amplifier 972 is associated with guides 970 and 974, as mentioned below. CW signal 964 propagates from guide 952 via combiner coupler 950, into light guide 948 from which it enters NLE 946.

Similarly, CW beam 944 arriving from guide 942 passes through NLE 946 to appear as amplified or suppressed beam 944 at radiation guide 948. The amplification or suppression of CW beam 944 at NLE 946 depends upon the intensity level of signal 964 that NLE 946 receives in a direction that is counter-propagating to signal 944. Amplified or suppressed CW beam 944 passes through guide 948, via coupler 950, into waveguide 952 where it propagates as CW signal 954. Splitter 956 (or a combiner for the clockwise propagating signals, as explained above) receives CW signal 954 from guide 952 and splits signal 954 into CW signals 960 and 966 propagating in radiation guides 958 and 970, respectively. CW signal 966 is amplified by optional amplifier 972 to appear at light guide 974 from which it is further coupled by combiner 930 (or a splitter for the clockwise propagating signals, as explained above) into guide 926 as CW signal 968. Optional amplifier 972 is associated with guides 970 and 974, as mentioned above. CW Signal 968 propagates from guide 926 via combiner-coupler 924 into light guide 922 from which it enters NLE 920.

Amplifier 912 and NLEs 920 and 946 may include optical isolators to avoid reflections of optical signals from loop 990 toward terminal 910. Such reflections from loop 990 may by be produced by the return of signal 968 from NLE 920 via splitter 914 to guide 912 and toward guide 910 or by the return of signal 964 from NLE 946 via splitter 914 to guide 912 and toward guide 910. Since NLEs 920 and 946 should receive signals in both directions, their optical isolators should be placed on the sides associated with guides 916 and 942, respectively, thus pre-amplifying respective signals 918 and 944.

Splitter 914 may be a symmetric splitter to provide signals 918 and 944 having similar intensities. If NLEs 920 and 946 have similar transmission functions and couplers 924 and 950 are similar, then signals 964 and 968 enter NLEs 946 and 920 with similar intensities as well. This situation is an unstable state of device 900 since it can exists only when device 900 is perfectly symmetric and signals 964 and 968 are exactly the same.

Initializations of Process—FIG. 8

In practice, the intensities of signals 964 and 968 at NLEs 946 and 920, respectively, are not exactly the same: there is always a slight difference between their intensities. This occurs, for example, if the intensity of signal 964 is slightly higher than the intensity of signal 968. This means that the gain of NLE 946 is suppressed by signal 964 more than the gain of NLE 920 that is suppressed by signal 968. In such a case, NLE 946 has a gain that is slightly lower than the gain of NLE 920. Thus NLE 946 amplifies signal 944 to produce signal 968 at guide 926. Signal 968 has a lower intensity than signal 964 at guide 952. Signal 964 at guide 952 is a product of signal 918 amplified by NLE 920, which has a gain that is slightly higher than the gain of NLE 946. Accordingly, this process continues and repeats itself in a positive-feedback closed loop which enhances itself by increasing the intensity of signal 964 and suppressing the intensity of signal 968 to further increase the differences between their intensities. Thus signal 964 continues to increase its intensity while signal 968 continues to decrease its intensity. At the same time the gain of NLE 946 continues to decrease due to the continuous increase in its suppression caused by the continuous increase of the intensity of signal 964. Signal 964 is enhanced by the gain increase of NLE 920 caused by the reduction in the intensity of signal 968.

This process continues to enhance itself until NLE 920 emits the maximum intensity it is capable of. If the gains of NLEs 920 and 946 and the intensities of signals 918 and 944 are high, the process may end at a preferred situation where NLE 920 emits an intensity that is equal to its saturation power and NLE 946 is deeply suppressed to block CW beam 944. In this case, bistable device 900 outputs CW signal 932 at output port 934. Signal 932 has a fraction of the saturation power emitted by NLE 920 as signal 928. At the same time, signal 944 may be blocked completely by NLE 946 and thus very small or no power is transmitted by NLE 946 as signal 954. Accordingly, very small or no power appears at output port 958 of device 900, corresponding to the absence of signal 960 at port 958. The state of device 900 in which the process ends is a stable state in which device 900 stays as long as no external activation is provided to device 900.

Stable State—FIG. 8

The end of the process, resulting in a stable state of device 900, depends upon its initial conditions. If for example, the initial process starts with signal 968 having an intensity that is higher than the intensity of signal 964, the process ends with a different stable state in which NLE 946 emits its high intensity signal 954 and NLE 920 is deeply suppressed and emits a very small or no signal 928.

In this case, bistable device 900 outputs CW signal 958 at output port 960, which is a fraction of the saturation power emitted by NLE 946 as signal 954. At the same time, signal 918 may be blocked completely by NLE 920 and thus very little or no power is transmitted by NLE 920 as signal 928. Accordingly, very little or no power appears at output port 934 of device 900, corresponding to the absence of signal 932 at port 934. This state of device 900 in which the process ends is also a stable state in which device 900 stays as long as no external activation is provided.

External activation is applied from Reset ("R") terminal 940 or from Set ("S") terminal 980. The Reset state of bistable device 900 is defined as the stable state "R-state" in which NLE 920 is deeply suppressed and emits a low-intensity signal 928, or no signal. At the same time NLE 946 may emit a high power signal 954. The R-state corresponds to high intensity signal 960 ("high state") at port 958.

Port 958 is defined as a $\overline{Q}$ port. The R-state corresponds to no or very little signal 932 ("low state") at port 934. Port 934 is defined as a Q port.

Similarly, the Set state of bistable device 900 is defined as the stable "S-state" in which NLE 946 is deeply suppressed and emits a low intensity signal 954 or no signal. At the same time NLE 920 may emit a high power signal 928. The S-state corresponds to high intensity signal 932 (in its "high state") at the Q port (port 934), and no or very little signal 960 (in its "low state") at the $\overline{Q}$ port (port 958).

Reset signal 984 (R-signal), that may be pulse 988, is applied to port 940 (R-port) to reset bistable device 900. Signal 984 propagates in port 940 and may pass through optional amplifier 938 to appear at guide 936 from which it is coupled, by coupler 924, into NLE 920. Optional amplifier 938 is used to amplify signal 984 to ensure that amplified signal 984 will have sufficient intensity to drive NLE 920 into a saturated state in which the gain of NLE 920 is suppressed to a level that can block signal 918 for preventing its appearance as signal 932 at port 934. When signal 984 is applied to port 940, device 900 is in the R-state in which signal 958 at port 960 ($\overline{Q}$ port) is in its high state and signal 932 at port 934 (port Q) is in its low state.

Since signal 984 (R-signal) drives NLE 920 into a saturated state, device 900 will be in the R-state regardless the state of device 900 (R-state or S-state) prior to the appearance of signal 988 at port 984. This means that if device 900 was in the S-state prior to the appearance of the R-signal, it is driven, by the R-signal, into a stable R-state. Alternatively, if device 900 was in the R-state prior to the appearance of the R signal, it remains in the R-state.

Similarly, Set signal 982 (S-signal), that may be pulse 986, is applied to port 980 (S port) to set bistable device 900. Signal 982 propagates in port 980 and may pass through optional amplifier 978 to appear at guide 976 from which it is coupled, by coupler 950, into NLE 946. Optional amplifier 978 is used to amplify signal 982 to ensure that amplified signal 982 will have sufficient intensity to drive NLE 946 into a saturated state in which the gain of NLE 946 is suppressed into a level that can block signal 944 for preventing its appearance as signal 960 at port 958. When signal 982 is applied to port 980, device 900 is in S-state in which signal 932 at port 934 (Q port) is in its high state and signal 960 at port 958 (port $\overline{Q}$) is in its low state.

Since signal 982 (S-signal) drives NLE 946 into a saturated state, device 900 will be in the S-state regardless the state of device 900 (R-state or S-state) prior to the appearance of signal 982 at port 980. This means that if device 900 was in the R-state prior to the appearance of the S-signal, it is driven, by the S-signal, into a stable S-state. Alternatively, if device 900 was in the S-state prior to the appearance of the S-signal, it remains in the S-state.

As is well-known for electronic set table and resettable bistable devices, a simultaneous drive of both an R-signal and an S-signal produces an unstable state in which there is no guarantee that the device will produce a known state at its $\overline{Q}$ and Q output ports.

Thus the complete truth table of optical bistable device 900 can be summarized as follows:

If the R-signal and the S-signal are both low, the Q and $\overline{Q}$ output ports maintain their previous levels.

If the R-signal is high and the S-signal is low, the Q output port is forced to a low level and the $\overline{Q}$ output port is forced to a high level, regardless of the previous Q and $\overline{Q}$ output ports levels.

If the R-signal is low and the S-signal is high, the Q output port is be forced to a high level and the $\overline{Q}$ output port is forced to a low level, regardless of the previous Q and $\overline{Q}$ output ports levels.

If the R-signal and the S-signal are both high, the output ports Q and $\overline{Q}$ cannot be determined.

The "low states" of the signals at ports $\overline{Q}$ and Q of device 900 in S and R states should be as low as possible. This can be achieved by driving NLEs 920 and 946, in R and S states, into deep saturation to dramatically suppress their gain to block beams 918 and 944, respectively. Driving NLEs 920 and 946 into deep saturation by beams 968 and 964 is achieved by operating NLEs 920 and 946 in low excitation levels. However in this case, the low excitation levels of NLEs 920 and 946 may produce low gains that result in low intensities for signals 968 and 964 that may not be sufficient for driving NLEs 920 and 946 into deep saturation.

In this case optional amplifier 972 is used to boost the intensity of signals 968 and 964 to allow these signals to drive NLEs 946 and 920 into deep saturation levels while these NLEs are still excited into low excitation levels. The combination of low excitation levels for NLEs 920 and 946 with strong signals 968 and 964 is achieved by the use of optional amplifier 972 that provides signals 932 and 960 at ports $\overline{Q}$ and Q, which may have very low intensity levels at their low states.

Device 900 may be operated when the wavelengths of signals 906, 984, and 982 at ports 910, 940, and 980 are the same or different. If needed, amplifier 908 may be used to boost signal 906 to produce the desired intensities of signals 968 and 964 corresponding to signals 944 and 918. NLEs 920 and 946 may be of any type of optical amplifiers, such as, SOAs, LOAs, and EDFAs. Amplifiers 908, 978, 938 and 972 may be of any type of optical amplifiers and any type of NLEs. Each of couplers 924, 930, 956, and 950 may be of the type of symmetric or asymmetric coupler. NLEs 920 and 946 and each of optional amplifiers 912, 938, and 978 may be excited by injection currents that are equal or different and are with accordance with the splitting ratios of couplers 924, 930, 956, and 950.

Figure 9A:
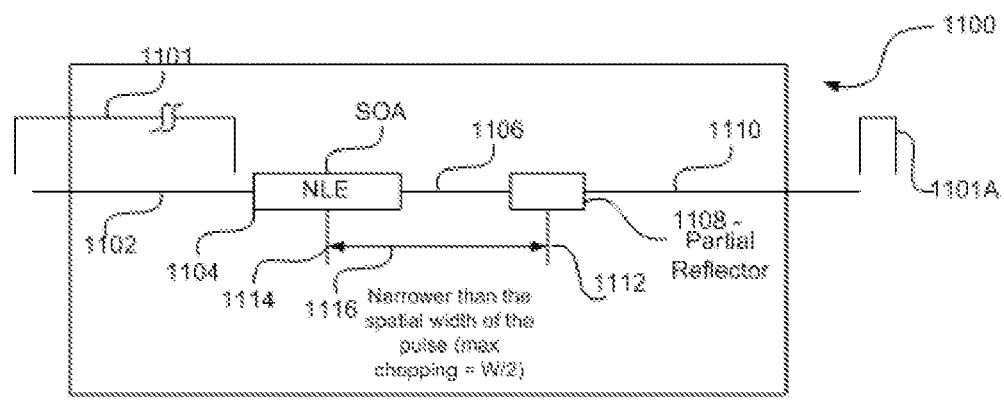

Compact Self-Chopper—FIG. 9a

FIG. 9a is a schematic illustration of alternative device 1100 for self chopping that can be manufactured compactly. As is explained below, self-chopper 1100 produces chopped pulses having a fixed width regardless of the width of the pulses that it receives. Accordingly, chopper 1100 is suitable for use as a dispersion corrector for pulses modulated according to the RZ format.

Radiation guide 1102 transmits pulses 1101 into NLE 1104, which preferably is an SOA. Pulses 1101 are amplified by NLE 1104 and are transmitted, by radiation guide 1106, from NLE 1104 to partial reflector 1108. Reflector 1108 reflects part of the energy of pulses 1101 back into radiation guide 1106 toward NLE 1104 and transmits the rest of the energy of pulses 1101 into radiation guide 1110 from which chopped pulses 1101A are emitted from chopper 1100.

Reflector 1108 is spaced from NLE 1104 by a distance 1116 that is smaller than half of the width W of pulses 1101. Thus the reflected part of each pulse 1101 that is reflected back from reflector 1108 into NLE 1104 via guide 1106 must collide with the other part of the same pulse 1101 that is still propagating in the opposite direction via NLE 1104 towards guide 1106 and reflector 1108.

The travel distance from the leading edge of pulse 1101 to the center of NLE 1104, indicated by line 1114, to the reflecting surface of partial reflector 1108 and back to the center of NLE 1104, is twice distance 1116. Thus if distance 1116 is smaller than half of the width of pulse 1101, the above-mentioned leading edge of pulse 1101 must collide, at NLE 1104, with another part of the same pulse 1101.

The part of pulse 1101 reflected back into NLE 1104 is amplified the second time in NLE 1104 and collides with the other part of the same pulse 1101 that is still propagating in NLE 1104 in the opposite direction and is amplified the first time in NLE 1104. Thus the returned part (leading edge) of pulse 1101 propagates in NLE 1104 with an intensity that is much higher than the intensity of the other part of the same pulse that is still propagating in NLE 1104 in the opposite direction. Accordingly the return part of pulse 1101 suppresses the gain, by Cross-Gain Modulation, for the still-coming part of the same pulse 1101 and chops it to produce narrow pulses at guide 1106. The above-mentioned suppression is efficient for chopping purposes only when the intensity of the return part of pulse 1101 is much higher than the still-coming part of the same pulse 1101 in NLE 1104. The return part of pulse 1101 returns to NLE 1104 after a round trip that includes amplification G at NLE 1104 and reflectivity R at partial reflector 1108. Thus, the intensity of the return part of pulse 1101 is higher than the intensity of the still-coming part of the same pulse 1101 in NLE 1104 by a factor of the product G*R when G is the gain of NLE 1104 and R is the reflectivity of partial reflector 1108. Thus G*R should be much greater than 1.

The chopping of pulses 1101 starts immediately upon the arrival of the returning leading edge of the same pulse 1101 back to NLE 1104. From this moment until the arrival of the next pulse 1101 to NLE 1104, no radiation or very little radiation is emitted from NLE 1104 toward guide 1106, partial reflector 1108, and out of device 1100. Pulses 1101A appear at guide 1110 as long as their returning leading edge did not arrive back at NLE 1104. Accordingly, the spatial width of pulse 1101A at guide 1110 is fixed and equal to twice the distance 1116 and is independent of the width of pulse 1101. The width of pulses 1101A can be adjusted by adjusting distance 1116.

Assume that the distance 1116 between partial reflector 1108 and NLE 1104 is smaller than half of the spatial width of the narrower pulse or the narrower "zero" in the pulse pattern of the NRZ modulation format, or narrower than half of the spatial width of the pulses in the pulse pattern of the RZ modulation format. In this case there will not be any crosstalk between the chopping of different pulses since the returning part of each pulse 1101 would leave NLE 1104 on its way back from reflector 1108 before the next pulse 1101 arrives at NLE 1104.

Since distance 1116 between partial reflector 1108 and NLE 1104 should be less than half of the narrower pulse (spatial width W), it should be less than 1 cm for a pulse rate of 10 Gbps and less than 2.5 mm for a pulse rate of 40 Gbps. Such small distances require the use of compact partial reflector 1108, such as those illustrated in FIGS. 9b-9g.

Figure 9C:
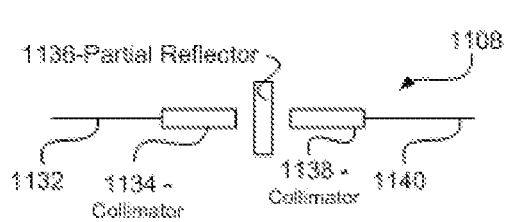
Figure 9B:
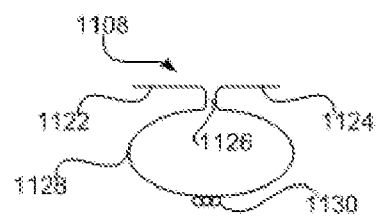

Optical Loop as Partial Reflector—FIG. 9b

FIG. 9b shows compact asymmetric partial reflector 1108 of FIG. 9a in the form of a compact optical loop mirror fabricated on a chip using the Planar Circuit (PLC) technique and including an asymmetric directional coupler 1126, terminals 1122 and 1124, and loop 1128. The energy of a signal that is received at terminal 1122 is partially reflected back into terminal 1122 from loop 1128 and the other part of the energy is transmitted to terminal 1124 via loop 1128. The amount of reflectivity of the partial reflector of FIG. 9b depends upon the coupling ratio of coupler 1126 and upon the birefringence at loop 1128. The latter may be controlled by polarization controller 1130. The partial reflector of FIG. 9b may be integrated as a partial reflector 1108 of FIG. 9a when terminals 1122 and 1124 of FIG. 9b are optically connected to radiation guides 1106 and 1110 of FIG. 9a, respectively.

Partial Reflector in Open Space—FIG. 9c

FIG. 9c shows a compact design for reflector 1108 of FIG. 9a in the form of a partial reflector plate fabricated using free-space (open-space) techniques. It includes terminals 1132 and 1140, collimators 1134 and 1138, and partial reflecting plate 1136. Collimators 1134 and 1138 are optically coupled on one of their sides to terminals 1132 and 1140, respectively, and on their other side to partial reflecting plate 1136. The energy of a signal that is received at terminal 1132 propagates toward partial reflecting plate 1136 via collimator 1134 and is partially reflected back into terminal 1132 from plate 1138 via collimator 1134. The other part of the energy of the signal received at terminal 1132 is transmitted to terminal 1140 via collimator 1134, plate 1136, and collimator 1138. The amount of the reflectivity of the partial reflector of FIG. 9b depends upon the reflectivity of plate 1136. The partial reflector of FIG. 9c may be integrated as partial reflector 1108 of FIG. 9a when terminals 1132 and 1140 of FIG. 9c are optically connected to radiation guides 1106 and 1110 of FIG. 9a, respectively.

Figure 9E:
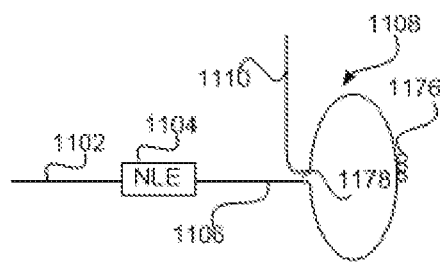
Figure 9D:
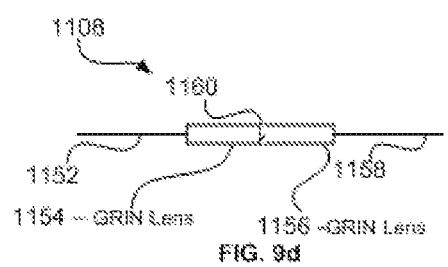

Partial Reflector Coupled To GRIN Lenses—FIGS. 9d and 9e

FIG. 9d shows a compact design for reflector 1108 of FIG. 9a in the form of two coupled Graded Index (GRIN) lenses 1154 and 1156. These have a partial reflecting surface 1160 between them. Surface 1160 may be a partial reflecting layer deposited upon the surface of one of GRIN lenses 1154 and 1156. GRIN lenses 1154 and 1156 are coupled to terminals 1152 and 1158, respectively. The energy of a signal that is received at terminal 1152 propagates toward partial reflecting surface 1160 via GRIN lens 1154 and is partially reflected back into terminal 1132 from surface 1160 via GRIN lens 1154. The other part of the energy of the signal received at terminal 1132 is transmitted to terminal 1158 via GRIN lens 1154, surface 1160, and GRIN lens 1156. The amount of the reflectivity of the partial reflector of FIG. 9b depends upon the reflectivity of surface 1160. The partial reflector of FIG. 9d is integrated as partial reflector 1108 of FIG. 9a when terminals 1152 and 1158 of FIG. 9d are optically connected to radiation guides 1106 and 1110 of FIG. 9a, respectively.

FIG. 9e shows the device of FIG. 9a when partial reflector 1108 is made from an optical loop mirror fabricated with optical fiber techniques. Polarization controller 1176 and adjustment of the coupling ratio of coupler 1178 are used to control the reflectivity of partial reflector 1108.

Figure 9G:
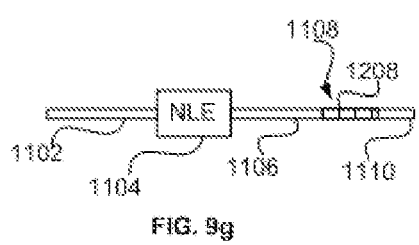
Figure 9F:
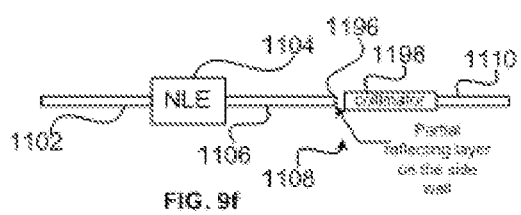

Side Wall as Partial Reflector—FIG. 9f

FIG. 9f shows the device of FIG. 9a when partial reflector 1108 is made from a sidewall partial reflector which is in turn made of a partially reflecting layer deposited upon the sidewall of a fiber or upon the sidewall of a semiconductor waveguide fabricated on a chip. The radiation transmitted by partially reflecting layer 1196 is coupled, by collimator 1198, into guide 1110. The radiation reflected back from partially reflecting layer 1196 propagates toward NLE 1104 via guide 1106.

Grating As Partial Reflector—FIG. 9g

FIG. 9g shows the device of FIG. 9a when partial reflector 1108 is made from a Bragg reflector grating 1208 whose pitch can be adjusted to produce the desired reflectivity. Grating 1208 can be fabricated on a fiber or on a semiconductor waveguide fabricated on a chip using PLC techniques. The radiation transmitted by partially reflecting grating 1208 is coupled into guide 1110. The radiation reflected back from grating 1208 propagates toward NLE 1104 via guide 1106.

Compact Self-Chopper for Pulses with RZ and NRZ Formats—FIG. 10

FIG. 10 illustrates self-chopper 1300 that produces adjustable fixed chopping and thus is suitable as a dispersion corrector for a pulse pattern modulated by the NRZ and RZ formats. Chopper 1300 includes chopper 1100 of FIG. 9a. The operation of chopper 1100 is explained in the description accompanying FIG. 9a.

Pulse 1332 is received at terminal 1302 and is amplified by an optional optical-amplifier that may be an SOA (Semiconductor Optical Amplifier). Pulse 1332 continuously propagates from amplifier 1304 via radiation guide 1306. Guide 1306 may include an optional device 1308 that is a filter, an optical isolator, or both. After filter 1308, pulse 1332 is split, by coupler 1312, into radiation guides 1322 and 1314. Pulse 1322 continues from guide 1314 and enters chopper 1100 of FIG. 9a. Pulse 1322 is emitted from chopper 1100 via output terminal 1110 and pass through optional filter 1316 as chopped pulse 1334. As explained above, the width of pulse 1334 is fixed and can be adjusted by varying distance 1116 between NLE 1104 and partial reflector 1108.

Chopped pulse 1334 propagates from filter 1316 via radiation guide 1318 to enter circulator/coupler 1320. Pulse 1334 exits circulator/coupler 1320 and continues along radiation guide 1328 that contains optical delay line 1326. Pulse 1334 enters NLE 1324 from guide 1328 to collide, at NLE 1324, with pulse 1322 arriving at NLE 1324 in the opposite direction from radiation guide 1322. Pulse 1334 may continue via guide 1322 and coupler 1312 toward device 1310 to be blocked there by an optical isolator.

Pulse 1334 is amplified by NLE 1104 of chopper 1100 prior to its arrival to NLE 1324 and thus has a much higher intensity than pulse 1332 arriving at NLE 1324 at a similar time. Accordingly, pulse 1334 suppresses the gain of NLE 1324 for pulse 1322 and chops it. The process of chopping pulse 1322 by a fixed width pulse 1334 is similar to the chopping of pulse 732 by a fixed width pulse 768 of FIG. 7a and is explained in the accompanied description of 7a.

Adjustable delay line 1326 controls the arrival time of pulse 1334 to NLE 1324 and affects the amount of chopping of pulse 1322 by pulse 1334. This controls the chopping by variable delay line 1326 and is similar to the control of variable delay line 729 used to adjust the chopping of pulse 732 by pulse 768 (FIG. 7a). The effect of the relative arrival time (controlled by variable delay line 1326) of pulses 1334 and 1322 to NLE 1324 on the chopping of pulse 1322 is similar to the effect of the relative arrival time (controlled by variable delay line 729) of pulses 732 and 768 to NLE 734 on the chopping of pulse 732, (FIGS. 7a, 7b, and 7c) with their concomitant descriptions.

Accordingly, pulse 1332 exits NLE 1324 as chopped pulse 1336 that propagates through radiation guide 1328 to pass through circulator/coupler 1320 and be emitted from chopper 1300 via output terminal 1330. Pulse 1330 has the original width of pulse 1332, less the amount of chopping produced by pulse 1334 at NLE 1324. As mentioned above, the fixed amount of chopping of chopper 1300 can be adjusted by varying and adjusting distance 1116 of chopper 1100 and adjusting and varying the delay time of delay line 1326 to produce the desired chopping for optimally correcting the amount of dispersions, such as chromatic and polarization mode dispersions.

Optical amplifier 1304 may be of the type of SOA whose injection current is adjusted to produce the necessary amount of Amplified Spontaneous Emission (ASE) for maintaining substantially fixed average power at NLE 1324. This power is independent of the pulse pattern of signal 1332. The gain instability caused by random Cross Gain Modulation (XGM) associated with the pulse pattern of pulses 1332 is substantially reduced to increase the stability of chopper 1300.

Additional Self-Chopper for Pulses with RZ and NRZ Formats—FIGS. 11a-11d

FIG. 11a illustrates a self-chopper 1400, which is designed to perform adjustable fixed chopping for correcting various dispersions of signals modulated according to the NRZ and RZ modulation formats. As will be explained below, device 1400 is wavelength, phase, and polarization insensitive and does not suffer from gain instability associated with random patterns.

Signal 1402 may suffer from broadening of its pulses due to various dispersions. It is received by terminal 1404 of chopper 1400. Terminal 1404 may include optional amplifier 1408 that is a SOA. Signal 1402 is amplified by amplifier 1408 and continues to propagate in the direction of arrow 1406 from amplifier 1408 through radiation guide 1410 to be directed, by directing device 1460, toward inverter wavelength converter 1458 via radiation guide 1461. While directing device 1460 is illustrated as a circulator, it may be a directional coupler as well. While device 1458 is illustrated as being an inverter wavelength converter in the form of an SOA, it may be of any type of inverter wavelength converter or inverter regenerator that may include any type of optical amplifier.

CW beam 1446 propagates along arrow 1448 enters terminal 1456 of directing device 1442. While directing device 1442 is illustrated as being a circulator, it may be a coupler as well. While the CW beam at terminal 1456 is illustrated as having wavelength $\lambda_2$ when signal 1402 is illustrated as having wavelength $\lambda_1$, both may have the same wavelength ($\lambda_2 = \lambda_1$) or a different wavelength ($\lambda_2 \neq \lambda_1$). Directing device 1442 directs CW beam 1446 toward NLE 1458 acting as an inverter and wavelength converter/inverter and regenerator 1458 via radiation guide 1454. The intensity of signal 1402 propagating through device 1458 is higher than the intensity of CW beam 1446 propagating through device 1458 at the same time. CW beam 1446 is modulated by signal 1402 and exits device 1458 as an amplified modulated beam having a pattern that is the inverse of the pattern of signal 1402.

If device 1458 is an SOA, the modulation of CW beam 1446 by signal 1402 is performed mainly by XGM and thus is wavelength, phase, and polarization insensitive. CW beam 1446 was amplified and modulated at device 1458. It continues to propagate via guide 1461 and is directed by directing device 1460 into radiation guide 1412 where it continues to propagate along arrow 1422, as modulated signal 1420 having a pattern that is inverted with respect to the pattern of signal 1402. Signal 1420 propagates from guide 1412 via optional filter 1414 through radiation guide 1424 and directing device 1416 toward NLE 1430 via radiation guide 1418. Directing devices 1460 and 1416 may be combined to a single directing device that may be a four-terminal circulator or a coupler.

NLE 1430 may be an optical amplifier that may be an SOA. Optional filter 1414, at radiation guide 1412, may be used to reduce the ASE produced by optional amplifier 1408 when it amplifies signal 1402 at terminal 1404. While directing device 1416 is illustrated as a circulator, it may be a coupler as well.

Signal 1402, amplified at device 1458, continues to propagate as amplified signal 1402, toward attenuator 1438 along arrow 1450 via guide 1454, directing device 1442, and radiation guide 1440. Signal 1402 is attenuated at attenuator 1438 and from there signal 1402 continues to propagate toward NLE 1430 through radiation guide 1436, variable optical delay line 1434, and radiation guide 1432.

Interleaving Process—FIG. 11

When delay line 1434 is adjusted to create an optical path from device 1458 to NLE 1430 via attenuator 1438, its length is equal to the length of the optical path from device 1458 to NLE 1430 via directing device 1416. Signals 1402 and 1420 pass through NLE 1430 in opposite directions in a way that the ZEROS of signal 1402 are interleaved with the ONES of signal 1420 and vice versa. The way that signals 1402 and 1420 are interleaved is illustrated in FIGS. 11*b*-11*d*. Signal 1402 is amplified by NLE 1430 and enters guide 1418 to be directed by directing device 1416 into output terminal 1426 where it propagates along arrow 1471 as signal 1470.

The ASE produced by amplifier 1408 is blocked by optional filter 1414 in the optical path of signal 1420. At the same time, the ASE of amplifier 1408 propagates in the optical path of signal 1402 in the direction of arrow 1450 toward NLE 1430. This may contribute to the gain stability at NLE 1430 by producing a fixed average power at NLE 1430 that in independent of the random pattern of signal 1402. Accordingly, amplifier 1408 may be of the type of SOA in which the current injected into it is set to produce adjustable ASE. This will control the amount of ASE that amplifier 1408 produces for achieving the optimal gain stability of NLE 1430.

FIGS. 11*b*-11*d* illustrate the arrival positions and the times of signals 1402 and 1420 to center 1428 of NLE 1430 in FIG. 11*a*. Signal 1402 arrives at center 1428 (FIG. 11*a*) with an intensity that is lower that the intensity in which signal 1420 that arrives at center 1428 of NLE 1430. The time delay of variable delay line 1434 is adjusted to produce a travel time of signal 1402 from device 1458 to NLE 1430 via attenuator 1438 that is equal to the travel time of signal 1420 from device 1458 to NLE 1430 via directing device 1416

FIG. 11*b* shows signal 1402 propagating along arrow 1450A and signal 1420 propagating along arrow 1422A. The leading edge of pulse 1480 of signal 1402 meets the leading edge of ZERO 1482 of signal 1420 just before pulse 1480 starts to interleave with ZERO 1482. ZERO 1482 of signal 1420 is the inverted XGM of CW beam 1446 produced by pulse 1480 of signal 1402 at device 1458 of FIG. 11*a*. Thus ZERO 1482 has a width that is similar to the width of pulse 1480. This means that the interleaving of pulse 1480 and ZERO 1482 is preformed at NLE 1430 of FIG. 11*a* with no overlap between signals 1402 and 1420.

FIG. 11*c* shows signal 1402 propagating along arrow 1450A and signal 1420 propagating along arrow 1422A. The leading edge of ZERO 1484 of signal 1402 meets the leading edge of pulse 1486 of signal 1420 just before pulse 1486 starts to interleave with ZERO 1484. Pulse 1486 of signal 1420 is the inverted XGM of CW beam 1446 produced by ZERO 1484 of signal 1402 at device 1458 of FIG. 11*a*. Thus ZERO 1484 has a width that is similar to the width of pulse 1486. This means that the interleaving of pulse 1486 and ZERO 1484 is preformed at NLE 1430 of FIG. 11*a* with no overlap between signals 1402 and 1420.

FIG. 11*d* is similar to FIG. 11*b* and shows signal 1402 propagating along arrow 1450A and signal 1420 propagating along arrow 1422A. The leading edge of pulse 1494 of signal 1402 meets the leading edge of ZERO 1492 of signal 1420 just before pulse 1494 starts to interleave with ZERO 1492. ZERO 1492 of signal 1420 is the inverted XGM of CW beam 1446 produced by pulse 1494 of signal 1402 at device 1458 of FIG. 11*a*. Thus ZERO 1492 has a width that is similar to the width of pulse 1494. This means that the interleaving of pulse 1494 and ZERO 1492 is preformed at NLE 1430 of FIG. 11*a* with no overlap between signals 1402 and 1420.

This process continues for every pulse of signal 1402 and its corresponding ZERO of signal 1420 and vice versa. That means that the average power passes through NLE 1430 in both directions along arrows 1450A and 1422A is continuous and fixed. Continuous power with a fixed average avoids gain instabilities due to a random XGM.

Arrival Time of Pulses to Midpoint of Loop—FIGS. 12*a*-*c*

FIGS. 12*a*-12*c* illustrate the arrival positions and times of signals 1402 and 1420 to center 1428 of NLE 1430 of FIG. 11*a*. FIGS. 12*a*-12*c* show the same signals 1402 and 1420 and center 1428 illustrated by FIGS. 11*b*-11*d* but at a different arrival time and when a different time delay is applied, by variable delay line 1434 of FIG. 11*a*, to signal 1402. The ZEROES of signals 1402 and 1420 are illustrated in FIGS. 11*b*-11*d*. The time delay of variable delay line 1434 corresponds to those illustrated in FIGS. 12*a*-12*c* and is adjusted to cause signal 1402 to be delayed by a time that is greater, by an amount equal to δw, than the time delay corresponding to that shown by FIGS. 11*b*-11*d*.

Chopping Sequence of Pulses—FIGS. 12*a*-12*c*

FIG. 12*a* shows signals 1402 and 1420 when the tail of ZERO 1482 of inverted signal 1420 arrives at center 1428 of NLE 1430 of FIG. 11*a*. Assume that the same delay of delay line 1434 of FIG. 11*a*, used for the illustration of FIG. 11*b*, is applied in the system of FIG. 12*a*. In this case the tail of pulse 1480 arrives to center 1428 together with the tail of ZERO 1482 of inverted signal 1420. Since signal 1402 is delayed by additional time delay δw, then the tail of pulse 1480 does not arrive at center 1428 when the tail of ZERO 1482 arrives at this center. In this case pulse 1482A that follows ZERO 1482 of inverted signal 1420 collides with pulse 1480 at NLE 1430 of FIG. 11*a*.

The collision between high intensity pulse 1482A of inverted signal 1420 and relatively low intensity pulse 1480 of signal 1402 lasts for a time that is equal to δw. δw is the time delay applied to signal 1402 by variable delay line 1434 for the illustration of FIG. 12*a* and is in addition to the time delay applied to signal 1402 by delay line 1434 for the illustration of FIG. 11*b*. The intensity of pulse 1482A is higher than the intensity of pulse 1480 (attenuated at attenuator 1434 of FIG. 11*a*) and thus pulse 1482A suppresses the gain of pulse 1480 by XGM at NLE 1430 of FIG. 11*a* for a time that is equal to δw. This means that pulse 1482A chops the time width of pulse 1480 at its tail by an amount equal to δw, shown as an area marked with hatched lines.

FIGS. 12b and 12c illustrate a chopping process similar to the one illustrated in FIG. 12a. The chopping process of pulse 1494 of signal 1402 by higher intensity pulse 1492A of inverted signal 1420 is illustrated in FIG. 12b. The chopping process of pulse 1498 of signal 1402 by higher intensity pulse 1496A of inverted signal 1420 is illustrated by FIG. 12c. Both are similar and analogous to the chopping process of pulse 1480 of signal 1402 by higher intensity pulse 1482A of inverted signal 1420 as illustrated in FIG. 12b and explained above in the description of FIG. 12a. In general, this process of chopping is applied to every pulse of signal 1402 which is chopped by a fixed amount δw that can be adjusted by varying the time delay of variable delay line 1434.

Pulses Before and After Chopping—FIG. 13

FIG. 13 shows signal 1402 before and after its chopping. Signal 1402 propagating in the direction of arrow 1450 is signal 1402 prior to its chopping by its inverted signal 1420. Signal 1402A propagating in the direction of arrow 1450A is signal 1402 after its chopping, by its inverted signal 1420, in the amount of δw.

Propagation Sequence of Pulses—FIGS. 14a-14b

FIGS. 14a and 14b shows the pulses of FIGS. 13a and 13b in a different time sequence but with the same amount of time delay applied by delay line 1434 of FIG. 11a. Low intensity pulse 1481A of signal 1402, illustrated in FIG. 14a, enters center 1428 of NLE 1430 of FIG. 11a at a time δw after high intensity pulse 1482A of inverted signal 1420 already left center 1428. Similarly, low intensity pulse 1483A of signal 1402, illustrated in FIG. 14b, enters center 1428 of NLE 1430 of FIG. 11a at a time δw after high intensity pulse 1487A of inverted signal 1420 has left center 1428. In general, every low intensity pulse of signal enters center 1428 of NLE 1430 of FIG. 11a at a time δw after every high intensity pulse of inverted signal 1420 that has already left center 1428.

The time period δw in which NLE 1430 of FIG. 11a has to recover (after the high intensity pulse of inverted signal 1420 left NLE 1430 of FIG. 11a and before the arrival of the low intensity pulse of signal 1402) allows NLE to increase its inverted population to enhance the gain of the leading edges of the pulses of signal 1402. Since the same recovery time is available for all the pulses of signal 1402, the leading edge of all of them will be enhanced by the same amount even for any random pattern of pulses.

Use of Gain Enhancement for Dispersion Correction—FIG. 15

FIG. 15 shows the gain enhancement of the leading edges of pulses 1480, 1481A, and 1483A of signal 1402 after they exit NLE 1430 of FIG. 11a. They appear later at terminal 1426 of chopper 1400 of FIG. 11a. The same enhancement of the leading edge exists for all the pulses of signal 1402 regardless of the width of this pulses and their pattern.

Use of Chopping and Gain Enhancement for Dispersion Correction—FIG. 16

FIG. 16 illustrates the way in which chopper 1400 of FIG. 11a may be used to correct dispersion and in particular Chromatic Dispersions (CD) and Polarization Mode Dispersions (PMD). Original signal 1402, prior to its broadening by dispersions, has a time width W and amplitude 1500. Signal 1402, after its broadening by dispersions, is shown as signal 1402$_D$ having a shape with three different amplitudes 1500A, 1500B, and 1500C at three different regions distributed along the width of the pulse. Since the energy of pulse 1402$_D$ is attenuated along the distance that pulse 1402 propagates while suffering from dispersion, and since the energy of pulse 1402 is distributed along a width W$_D$ that is wider than the original width W of original pulse 1402, amplitudes 1500A, 1500B, and 1500C are all smaller than amplitude 1500 of original signal 1402.

Pulse 1402$_D$ is fed into input 1404 of chopper 1400 of FIG. 11a and exits from output terminal 1426 of chopper 1400 of FIG. 11a as signal 1471, shown in FIG. 16 as signal 1402A. As explained above and illustrated in FIGS. 12a-12c and 13, the tail of pulse 1402$_D$ having amplitude 1500C, is chopped by an amount δw that can be adjusted to be equal to the amount of the broadening of pulse 1402$_D$ given by W$_D$-W. At the same time, the leading edge of pulse 1402$_D$, having amplitude 1500B is amplified by an enhanced gain, as explained above and illustrated in FIGS. 14a, 14b, and 15, that is larger than the gain in which amplitude 1500A of pulse 1402$_D$ is amplified. Accordingly, pulse 1402$_D$ is amplified by the total gain of chopper 1400 of FIG. 11a when its leading edge has an enhanced amplification that increases amplitude 1500B the same amount which amplitude 1500A of the center of pulse 1402$_D$ is increases. At the same time the tail of pulse 1402$_D$ is chopped out to leave pulse 1402A with a restored shape that is similar to the shape of original pulse 1402. Pulse 1402 has substantially uniform amplitude 1500D that may even be larger than amplitude 1500 of original signal 1402.

The above explanation is true for any pulse width and pulse patterns, such as the NRZ and RZ modulation formats, of pulses 1402 and 1402D that arrives at chopper 1400 of FIG. 11a. Chopper 1400 of FIG. 11a, like all the other devices illustrated and described, uses a working principle that is based upon XGM and thus is substantially wavelength, phase, and polarization insensitive.

CONCLUSIONS, RAMIFICATIONS AND SCOPE

Thus it can be seen that various aspects provide various advantages, including phase, wavelength and polarization insensitive optical devices having stable gain. The devices include choppers, dispersion correctors, wavelength converters, regenerators, bistable devices, and devices for converting one modulation format to another.

While certain features have been illustrated and described, many modifications, substitutions, changes, and equivalents may occur to those of ordinary skill in the art.

In some of the exemplary embodiments, the control signal and the information signal are counter-propagating. In this mode some of the embodiments may include more than one NLE or more than one optical amplifier. Nevertheless the output signal of these embodiments may include an Amplified Spontaneous Emission (ASE) of only one NLE or only one optical amplifier.

While some of the embodiments are illustrated as being operated in the counter-propagating mode between the information signal and the control signal, they may also operate in a co-propagating mode.

All the embodiments may be realized through a series of optical components connected by light guiding media, such as free-space, optical fibers, planar waveguides, or planar circuits (PLC), which media may be fabricated using integrated optical techniques and/or on-chip manufacturing. Alternatively, all the embodiments may also be constructed from discrete components, in which case the optical guiding media may be replaced by open space, e.g., vacuum, or by a non-solid, e.g., gaseous media, and the directional couplers may be replaced with beam splitters. All amplifiers and attenuators may include variable and/or adjustable components.

The optical circulators illustrated in the drawings of the embodiments are directing device which serves as directing and/or coupling devices having high coupling efficiency. They may be replaced, in all or in part, by any devices performing similar functions to directing and/or coupling optical signals. Such devices may be symmetric or asymmetric devices and can have any coupling or splitting ratio. The devices can be Wavelength Division Multiplexing (WDM) couplers, directional couplers, Y-junction couplers, star couplers, cascades of couplers/splitters, combiners, beam splitters, dielectric beam splitters, and metallic beam splitters, as typical examples.

The optical isolators in the various embodiments described above are removing devices that may be wavelength filters and serve to separate source signals, either optical pulses or CW beams, from any returning signals. Therefore, they may be implemented using other optical components serving the same function, such as an optical circulator or a WDM coupler.

The use of directional couplers in the various embodiments serves the function of dividing the input signal, either an optical pulse or a CW beam, into two different optical paths. Therefore, they may be implemented using other optical components serving the same function, such as an optical beam splitter as a typical example.

The activating or control signal for the embodiments may or may not have the same wavelength as the input signal of these embodiments.

The NLEs may also be of any type of optical amplifier and the amplifiers may be any type of NLE.

The attenuators may be of any type of optical amplifiers adjusted to produce attenuation by providing a gain smaller than one.

While the input and activating/control signals for the embodiments may be illustrated and described as being CW beams or in modulated form, they may have any of these forms.

The input and activating/control signals for the embodiments may be modulated according to the RZ or NRZ modulation formats.

While in some of the illustrations of the embodiments the activating signals are shown as applied in a counter-propagating mode with respect to the input signals, the activating signals may also be applied in a co-propagating mode with respect to the input signals.

Thus the appended claims and their legal equivalents are intended to cover all such modifications and changes as fall within the true spirit of the embodiments.

The invention claimed is:

1. An optical chopper, comprising:
   (a) an optical loop having first and second terminals and including first and second nonlinear elements;
   (b) said optical loop being arranged to receive, at said first and second terminals, a pulse-modulated signal and a continuous beam, respectively, and
   (c) said optical loop arranged to cause said pulse-modulated signal and said continuous beam to counter-propagate in said optical loop and to produce in said first nonlinear element an inverted pulse-modulated signal having modulation which is inverted with respect to the pulse modulation of said pulse-modulated signal and to cause said inverted pulse-modulated signal to chop said pulse-modulated signal in said second nonlinear element.

2. The optical chopper of claim 1 wherein said optical loop includes an output terminal and is arranged to produce dispersion correction by chopping said pulses of said first modulated signal for producing dispersion-corrected pulses in said output.

3. The dispersion correction of claim 2 wherein said optical loop further includes a variable delay line for controlling said dispersion correction.

4. The chopper of claim 1 wherein at least one of said first and second nonlinear elements is an optical amplifier.

5. The chopper of claim 1 wherein said at least one of said first and second nonlinear elements is a semiconductor optical amplifier.

6. The chopper of claim 1 wherein said optical loop includes a variable delay line.

7. The chopper of claim 1 wherein said optical loop includes a filter.

8. The chopper of claim 1 wherein said optical loop includes a variable attenuator.

9. The chopper of claim 1 wherein said first terminal includes an optical amplifier.

10. The chopper of claim 9 wherein said optical amplifier is a semiconductor optical amplifier.

11. The chopper of claim 10 wherein said semiconductor optical amplifier includes a terminal for receiving adjustable injected current to control said semiconductor amplifier.

12. The chopper of claim 1 wherein said chopper is constructed at least in part in a medium selected from the group consisting of discrete components, on-chip devices, integrated optics, planar waveguides, planar circuits, waveguides, radiation guides, light guides, optical fibers, free space, a vacuum medium, and a gaseous medium.

13. The chopper of claim 1, further including a variable delay line in said optical loop, said delay line being adjusted for producing head chopping of said pulse-modulated signal.

14. The chopper of claim 1 further including a variable delay line in said optical loop, said delay line being adjusted for producing tail chopping of said pulse-modulated signal.

15. The chopper of claim 1 wherein said pulse-modulated signal has the same wavelength as said continuous beam.

16. The chopper of claim 1 wherein said optical loop further includes a variable delay line and a variable attenuator.

17. The chopper of claim 16 wherein said optical loop further includes a filter.

18. The chopper of claim 1 wherein said pulse-modulated signal has a wavelength that is different than the wavelength of said continuous beam.

19. The chopper of claim 1 wherein the intensity of said pulse-modulated signal in said second nonlinear element is lower than the intensity of said inverted pulse-modulated signal.

20. The chopper of claim 1 wherein at least one of said first and second nonlinear elements is a semiconductor optical amplifier.

21. The chopper of claim 1 wherein said optical loop further includes a variable delay line in said optical loop to adjust the arrival time of said pulse-modulated signal and said continuous beam to said second nonlinear element.

22. The chopper of claim 1 wherein at least one of said first and second terminals is a terminal of a device selected from the group consisting of circulators and couplers having terminals associated with said optical loop.

23. An optical chopper comprising:
   (a) a nonlinear element having first and second terminals, and a partial reflector (b) said non linear element being arranged to receive an optical pulse at said first terminal and transmit said pulse to said second terminal;
(c) said second terminal including said partial reflector;
(d) said partial reflector being spaced from said nonlinear element by a distance that is smaller than half of the spatial width of said pulse;
(e) said partial reflector being arranged to reflect part of said pulse back into said nonlinear element,
(f) said nonlinear element being arranged to chop said pulse for producing a narrower pulse,
(g) said second terminal being arranged to direct said narrower pulse through said partial reflector,
(h) said partial reflector being arranged to emit said narrower pulse out at said second terminal.

24. The chopper of claim 23 wherein said distance is adjusted to produce dispersion corrections by chopping said pulse.

25. The chopper of claim 23 wherein said nonlinear element is an optical amplifier.

26. The chopper of claim 23 wherein said nonlinear element is a semiconductor optical amplifier.

27. The chopper of claim 23 wherein said partial reflector is selected from the group consisting of partial reflecting plates, partial reflecting loops, and partial reflecting gratings.

28. The chopper of claim 23 wherein said chopper is constructed at least in part in a medium selected from the group consisting of media including discrete components, on-chip devices, integrated optics, planar waveguides, planar circuits, waveguides, radiation guides, light guides, optical fibers, free space, a vacuum medium, and a gaseous medium.

29. The chopper of claim 23 wherein said distance is adjusted to produce tail chopping of said pulse.

30. The chopper of claim 23 wherein said second nonlinear element is arranged to chop said pulse in said nonlinear element by cross gain modulation.

31. The chopper of claim 23 wherein said distance is adjusted to produce dispersion correction by chopping said pulse wherein said pulse is modulated by non-return to zero and return to zero modulation formats.

32. A method of optically chopping, comprising:
providing an optical loop having first and second terminals and including first and second nonlinear elements;
providing, at said first and second terminals a pulse-modulated signal and a continuous beam, respectively, and
causing said pulse-modulated signal and said continuous beam to counter-propagate in said optical loop for producing in said first nonlinear element an inverted pulse-modulated signal having modulation which is inverted with respect to the pulse modulation of said pulse-modulated signal and arranging said inverted pulse-modulated signal for chopping said pulse-modulated signal in said second nonlinear element.

33. The method of claim 32, further including delaying said pulse-modulated signal in said optical loop.

34. The method of claim 33, further including adjusting said delaying for controlling said chopping.

35. The method of claim 32, further including an output terminal in said optical loop.

36. The method of claim 32 wherein at least one of said first and second nonlinear elements is a semiconductor optical amplifier.

* * * * *

UNITED STATES PATENT AND TRADEMARK OFFICE
CERTIFICATE OF CORRECTION

| | |
|---|---|
| PATENT NO. | : 7,379,644 B2 |
| APPLICATION NO. | : 11/550122 |
| DATED | : May 27, 2008 |
| INVENTOR(S) | : Arie Shahar |

Page 1 of 1

It is certified that error appears in the above-identified patent and that said Letters Patent is hereby corrected as shown below:

Col. 7, line 42, delete "when it".

Col. 18, line 31, change "Fore" to --For--.

Signed and Sealed this

Nineteenth Day of August, 2008

JON W. DUDAS
*Director of the United States Patent and Trademark Office*